United States Patent
Chen

(10) Patent No.: US 10,892,688 B2
(45) Date of Patent: Jan. 12, 2021

(54) SWITCHING POWER SUPPLY APPARATUS CONTROL METHOD AND CONTROL CIRCUIT OF SWITCHING POWER SUPPLY APPARATUS

(71) Applicant: FUJI ELECTRIC CO., LTD., Kawasaki (JP)

(72) Inventor: Jian Chen, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/699,425

(22) Filed: Nov. 29, 2019

(65) Prior Publication Data

US 2020/0099310 A1 Mar. 26, 2020

Related U.S. Application Data

(63) Continuation of application No. PCT/JP2018/035934, filed on Sep. 27, 2018.

(30) Foreign Application Priority Data

Dec. 6, 2017 (JP) ................................ 2017-233888

(51) Int. Cl.
*H02M 3/335* (2006.01)
*H02M 1/38* (2007.01)
*H02M 1/00* (2006.01)

(52) U.S. Cl.
CPC ......... *H02M 3/33569* (2013.01); *H02M 1/38* (2013.01); *H02M 2001/0009* (2013.01); *H02M 2001/0058* (2013.01)

(58) Field of Classification Search
CPC ......... H02M 3/33553; H02M 3/33515; H02M 3/33569; H02M 1/38; H02M 2001/0009;
(Continued)

(56) References Cited

U.S. PATENT DOCUMENTS 5,159,541 A * 10/1992 Jain ................... H02M 3/33569
363/26
9,065,350 B2 6/2015 Halberstadt
(Continued)

FOREIGN PATENT DOCUMENTS

| JP | 2005151608 A | 6/2005 |
|----|--------------|--------|
| JP | 2014212642 A | 11/2014 |

(Continued)

OTHER PUBLICATIONS

Claudio Adragna, "Time-shift Control of LLC Resonant Converters", Conference Paper, PCIM Europe, May 2010.
(Continued)

*Primary Examiner* — Kyle J Moody
*Assistant Examiner* — Jye-June Lee
(74) *Attorney, Agent, or Firm* — Rabin & Berdo, P.C.

(57) ABSTRACT

First, it is assumed that a low-side switching element is turned off. At this time a resonance current before-inversion time is counted. When a resonance current is inverted, a count value is held and the counting operation of a resonance current after-inversion time is begun. Next, a target value of the resonance current after-inversion time at which a high-side switching element is to be turned off is calculated based on a feedback signal and the counting operation of the resonance current after-inversion time is continued. When a count value reaches the target value, the counting operation of the resonance current after-inversion time is ended and the high-side switching element is turned off. After a high-side half cycle is controlled, a low-side half cycle is controlled in the same way. Responsiveness to a sudden change in load is improved by exercising control every half cycle.

21 Claims, 12 Drawing Sheets

(58) Field of Classification Search
CPC .......... H02M 2001/0058; Y02B 70/10; Y02B 70/1491; Y02B 70/1433
See application file for complete search history.

(56) References Cited

U.S. PATENT DOCUMENTS

| | | | | |
|---|---|---|---|---|
| 9,960,693 B1 * | 5/2018 | Feldtkeller | ........ | H02M 3/33523 |
| 2005/0099827 A1 | 5/2005 | Sase et al. | | |
| 2005/0265058 A1 * | 12/2005 | Stevanovic | ........... | H02M 3/156 |
| | | | | 363/131 |
| 2010/0067262 A1 * | 3/2010 | Chen | ................. | H02M 3/33592 |
| | | | | 363/21.06 |
| 2012/0134705 A1 * | 5/2012 | Fukutani | ........... | H02M 3/33569 |
| | | | | 399/88 |
| 2012/0230059 A1 * | 9/2012 | Adragna | ........... | H02M 3/33507 |
| | | | | 363/16 |
| 2014/0313787 A1 | 10/2014 | Chen | | |

FOREIGN PATENT DOCUMENTS

| | | | |
|---|---|---|---|
| JP | 2016131411 A | 7/2016 | |
| WO | WO-2012105077 A1 * | 8/2012 | ........ H02M 3/33507 |

OTHER PUBLICATIONS

International Search Report for PCT/JP2018/035934, dated Dec. 11, 2018.
Written Opinion for PCT/JP2018/035934, dated Dec. 11, 2018.

* cited by examiner

SWITCHING POWER SUPPLY APPARATUS CONTROL METHOD AND CONTROL CIRCUIT OF SWITCHING POWER SUPPLY APPARATUS

CROSS-REFERENCE TO RELATED APPLICATION

This application is a continuation application of International Application PCT/JP2018/035934 filed on Sep. 27, 2018 which designated the U.S., which claims priority to Japanese Patent Application No. 2017-233888, filed on Dec. 6, 2017, the entire contents of which are incorporated herein by reference.

BACKGROUND OF THE INVENTION

1. Field of the Invention

The embodiments discussed herein are related to a control method of a switching power supply apparatus whose responsiveness to a sudden change in load is improved and a control circuit of a switching power supply apparatus.

2. Background of the Related Art

A current resonance converter is used as a highly efficient switching power supply apparatus. Usually a current resonance converter includes a half-bridge circuit, a resonance circuit, and a rectifying circuit. The half-bridge circuit includes two switching elements connected in series. The half-bridge circuit performs switching of the two switching elements alternately. By doing so, the half-bridge circuit converts a direct-current voltage to a rectangular voltage and outputs it. The resonance circuit includes a resonance inductor, an excitation inductor of a transformer, and a resonance capacitor. The resonance circuit receives the rectangular voltage, performs a resonance operation, and outputs an alternating voltage to the secondary side of the transformer. The rectifying circuit rectifies the alternating voltage, performs smoothing by a capacitor, and outputs a direct-current voltage. This direct-current output voltage is applied to a load.

With this current resonance converter, an error signal between the output voltage and a target voltage is fed back to a control integrated circuit (IC) of the half-bridge circuit and a switching frequency corresponding to the error signal is generated. This method is what is called voltage mode control. The output voltage is controlled by the voltage mode control so as to be constant. With the voltage mode control a system which feeds back the error signal includes a phase compensation capacitor. With the current resonance converter the phase compensation capacitor has a large capacitance value. On the other hand, usually a switching power supply apparatus exercises the following control. In a case where a load is light (including a case where there is no load), the switching power supply apparatus performs burst operation (intermittent operation) for improving efficiency. When the load becomes heavier, the switching power supply apparatus returns to continuous operation. When the switching power supply apparatus shifts to continuous operation due to a sudden increase in load, a change in feedback voltage is slow due to a large capacitance value of a phase compensation capacitor. As a result, the speed at which the switching power supply apparatus returns to continuous operation is slow. Therefore, a response to load fluctuations is not good.

On the other hand, a load transient response in current mode control is more rapid than that in the voltage mode control. This current mode control is used for controlling power transmission from the primary side to the secondary side of a transformer every switching cycle (see, for example, U.S. Pat. No. 9,065,350). According to the technique disclosed in U.S. Pat. No. 9,065,350, for example, a center voltage generated by dividing an input voltage and an error voltage which will be generated on the basis of a signal obtained by feeding back an output voltage are found. From the center voltage and the error voltage, a first threshold voltage higher than the center voltage by the error voltage and a second threshold voltage lower than the center voltage by the error voltage are set.

A sine-wave resonance voltage generated by dividing a voltage across a resonance capacitor is compared with the first threshold voltage and the second threshold voltage. When the resonance voltage changes and rises to the first threshold voltage, a high-side switching element is turned off. When the resonance voltage changes and falls to the second threshold voltage, a low-side switching element is turned off. The first threshold voltage and the second threshold voltage change in this way according to the output voltage. Accordingly, a switching frequency (or a switching cycle) is changed and control is exercised so that the output voltage will become constant. Furthermore, the first threshold voltage and the second threshold voltage are set so that they will be higher and lower, respectively, than the center voltage by the same error voltage. Therefore, the time ratio of a square wave generated by a half-bridge circuit is kept at 50%.

However, with the technique disclosed in U.S. Pat. No. 9,065,350, for example, an external voltage division circuit including a resistor and a capacitor is needed, as illustrated in FIG. 14, for detecting an input voltage of a power supply and a voltage across the resonance capacitor. This increases the costs. Furthermore, great accuracy is needed for the resistor and the capacitor included in the voltage division circuit. However, there is considerable variation in the resistor and the capacitor. As a result, it is very difficult to exercise control especially at no-load time.

SUMMARY OF THE INVENTION

According to an aspect, there is provided a method for controlling a switching power supply apparatus including a half-bridge circuit having a first high-side switching element and a second low-side switching element connected in series and a resonance circuit having a resonance inductor and a resonance capacitor, including detecting a resonance current of the resonance circuit acquiring a feedback signal indicative of an error between an output voltage and a target voltage from an output circuit which outputs a direct-current voltage; calculating a resonance current after-inversion time, during a half cycle that extends from a time when one of the first high-side switching element or the second low-side switching element is turned off to a time when another of the first switching high-side element or the second low-side switching element is turned off, the calculating of the resonance current after-inversion time extending from a time when a polarity of the resonance current is inverted to a time when the half cycle ends, the calculating being based on a multiplication of time information obtained by performing counting from a time when the half cycle begins and a value of the feedback signal acquired at the time when the half cycle begins, and turning off said other of the first high-side switching element or the second low-side switching element after the calculated resonance current after-inversion time has elapsed after the polarity of the resonance current is inverted.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Embodiments will now be described in detail with reference to the accompanying drawings with a case where they are applied to an LLC current resonance converter which is a switching power supply apparatus as an example. Components in figures indicated by the same numerals are the same. Furthermore, in the following description the same numeral may be used for representing the name of a terminal and a voltage, a signal, or the like at the terminal.

First Embodiment

Figure 1:
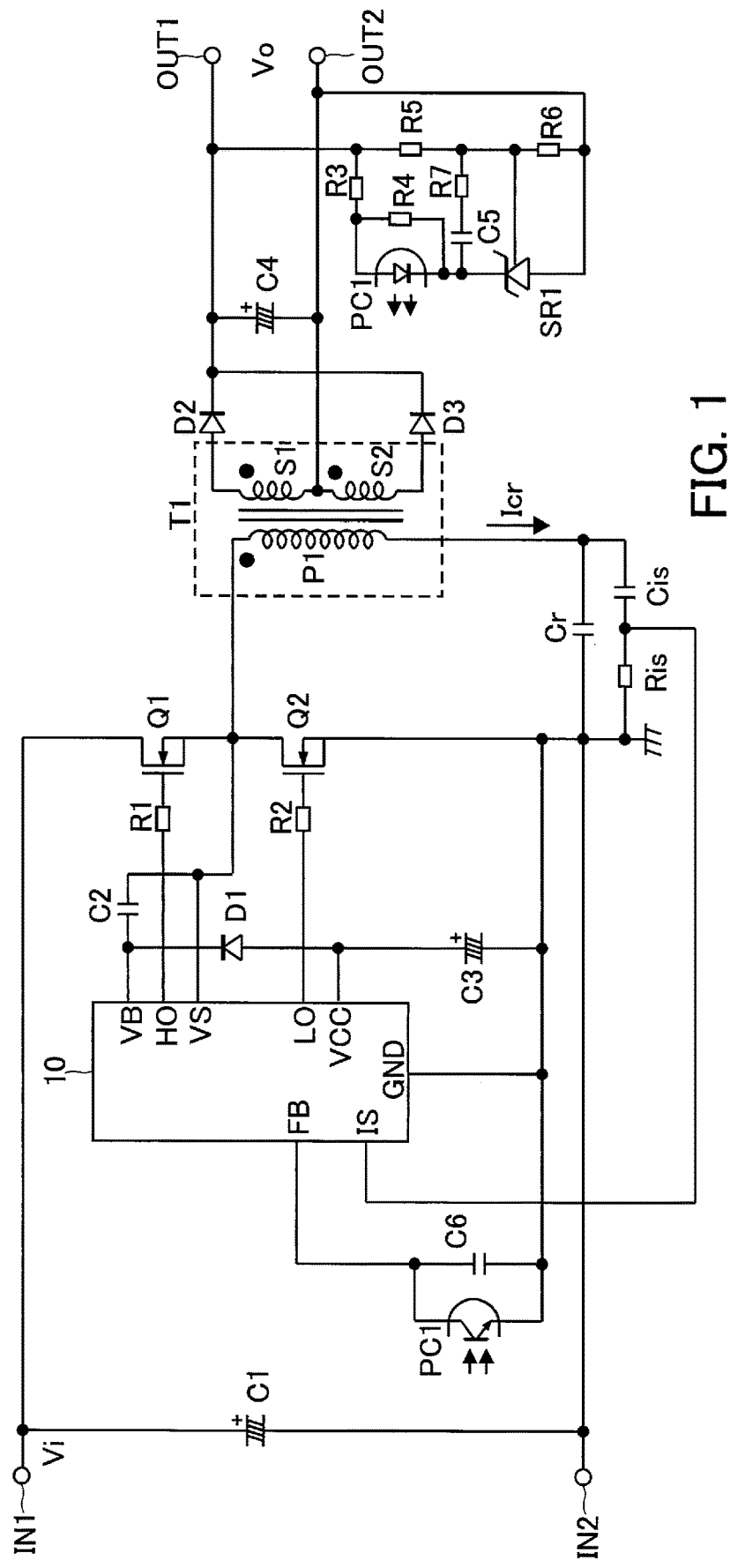
FIG. 1 is a circuit diagram illustrative of an example of the structure of a switching power supply apparatus according to a first embodiment.
Figure 2:
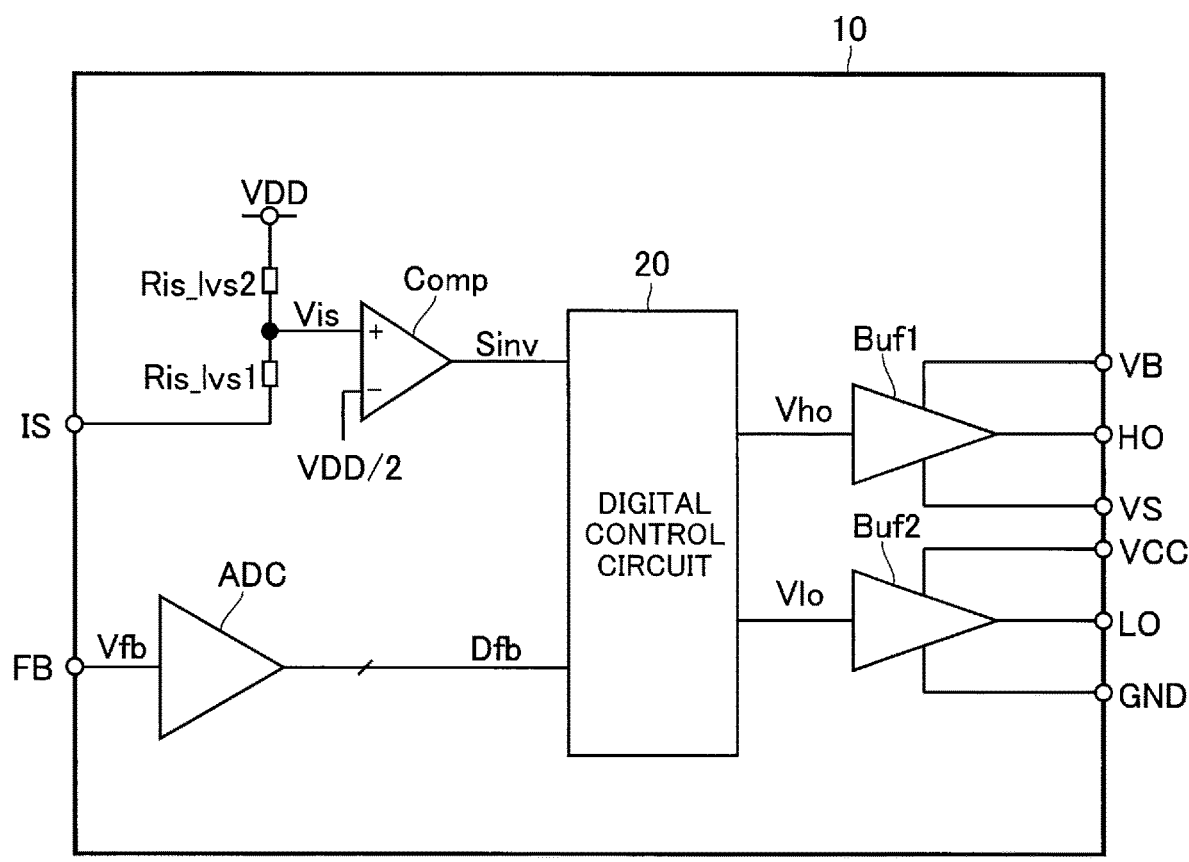
FIG. 2 illustrates an example of the structure of a control IC which controls the switching power supply apparatus.

FIG. 1 is a circuit diagram illustrative of an example of the structure of a switching power supply apparatus according to a first embodiment. FIG. 2 illustrates an example of the structure of a control IC which controls the switching power supply apparatus.

As illustrated in FIG. 1, a switching power supply apparatus according to a first embodiment has input terminals IN1 and IN2 and a direct-current voltage Vi is applied between the input terminals IN1 and IN2. The direct-current voltage Vi may be an output voltage of a power factor correction (PFC) circuit which improves a power factor by restraining a harmonic current generated by the switching power supply apparatus to a limit value. Furthermore, the input terminals IN1 and IN2 are connected to both terminals of a capacitor C1.

In addition, the input terminals IN1 and IN2 are connected to a half-bridge circuit including a high-side switching element Q1 and a low-side switching element Q2 connected in series. That is to say, the input terminal IN1 is connected to a drain terminal of the switching element Q1. A source terminal of the switching element Q1 is connected to a drain terminal of the switching element Q2. A source terminal of the switching element Q2 is connected to the input terminal IN2. In the example of FIG. 1, N-channel metal-oxide-semiconductor field-effect transistors (MOSFETs) are used as the switching elements Q1 and Q2.

A gate terminal of the high-side switching element Q1 is connected to one terminal of a resistor R1 and the other terminal of the resistor R1 is connected to an HO terminal of a control IC 10. A gate terminal of the low-side switching element Q2 is connected to one terminal of a resistor R2 and the other terminal of the resistor R2 is connected to an LO terminal of the control IC 10. A common connection point of the switching elements Q1 and Q2 is connected to a VS terminal of the control IC 10 and one terminal of a bootstrap capacitor C2. The other terminal of the bootstrap capacitor C2 is connected to a VB terminal of the control IC 10 which is a power source terminal of a high-side circuit.

A VCC terminal of the control IC 10 which is a power source terminal of a low-side circuit is connected to one terminal of a capacitor C3 and an anode terminal of a bootstrap diode D1. The other terminal of the capacitor C3 is connected to a GND terminal of the control IC 10. A cathode terminal of the bootstrap diode D1 is connected to the VB terminal of the control IC 10.

Furthermore, the common connection point of the switching elements Q1 and Q2 is connected to one terminal of a primary winding P1 of a transformer T1 and the other terminal of the primary winding P1 is connected to one terminal of a resonance capacitor Cr. The other terminal of the resonance capacitor Cr is connected to the GND terminal of the control IC 10 and the input terminal IN2. A leakage inductance between the primary winding P1 and secondary windings S1 and S2 of the transformer T1 and the resonance capacitor Cr make up a resonance circuit. The resonance capacitor Cr and a resonance inductor other than the inductance included in the transformer T1 may be connected in series to make up a resonance circuit. In this case, the leakage inductance is not used. Furthermore, the one terminal of the resonance capacitor Cr is connected to one terminal of a shunt capacitor Cis. The other terminal of the shunt capacitor Cis is connected to one terminal of a shunt resistor Ris. The other terminal of the shunt resistor Ris is connected to the GND terminal of the control IC 10. A common connection point of the shunt capacitor Cis and the shunt resistor Ris is connected to an IS terminal of the control IC 10. A signal obtained by shunting a resonance current Icr flowing to the resonance capacitor Cr and converting an obtained current to a voltage is supplied to the control IC 10.

One terminal of the secondary winding S1 of the transformer T1 is connected to an anode terminal of a diode D2. One terminal of the secondary winding S2 of the transformer T1 is connected to an anode terminal of a diode D3. Cathode terminals of the diodes D2 and D3 are connected to a positive electrode terminal of an output capacitor C4 and an output terminal OUT1. A negative electrode terminal of the output capacitor C4 is connected to a common connection point of the other terminals of the secondary windings S1 and S2 and an output terminal OUT2. The secondary windings S1 and S2, the diodes D2 and D3, and the output capacitor C4 make up a circuit which rectifies and smooths an alternating voltage generated in the secondary windings S1 and S2 and which converts it to a direct-current output voltage Vo. This circuit is an output circuit of the switching power supply apparatus. A load is connected to the output terminals OUT1 and OUT2.

The positive electrode terminal of the output capacitor C4 is connected via a resistor R3 to an anode terminal of a light-emitting diode of a photocoupler PC1. A cathode terminal of the light-emitting diode is connected to a cathode terminal of a shunt regulator SR1. A resistor R4 is connected between the anode terminal and the cathode terminal of the light-emitting diode. The shunt regulator SR1 has a reference terminal connected to a connection point of resistors R5 and R6 connected in series between the positive electrode terminal and the negative electrode terminal of the output capacitor C4. A circuit made up of a resistor R7 and a capacitor C5 connected in series is connected between the reference terminal and the cathode terminal of the shunt regulator SR1. The shunt regulator SR1 causes a current corresponding to the difference between a voltage obtained by dividing the output voltage Vo (voltage across the output capacitor C4) and an internal reference voltage to flow to the light-emitting diode of the photocoupler PC1. A collector terminal of a phototransistor of the photocoupler PC1 is connected to an FB terminal of the control IC 10. An emitter terminal of the phototransistor is connected to the GND terminal of the control IC 10. A capacitor C6 is connected between the collector terminal and the emitter terminal of the phototransistor. Accordingly, the shunt regulator SR1 feeds back an error signal between the output voltage Vo and a target voltage to the control IC 10 in order to exercise control so as to make the output voltage Vo the target voltage.

In the control IC 10, as illustrated in FIG. 2, the IS terminal is connected to one terminal of a resistor Ris_lvs1 and the other terminal of the resistor Ris_lvs1 is connected to one terminal of a resistor Ris_lvs2. The other terminal of the resistor Ris_lvs2 is connected to an internal voltage source which supplies a reference voltage VDD. As a result, the resistor Ris_lvs1 and the resistor Ris_lvs2 make up a pull-up circuit. Furthermore, the resistor Ris_lvs1 and the resistor Ris_lvs2 are equal in resistance value so as to realize a voltage division ratio of 1/2. A common connection point of the resistor Ris_lvs1 and the resistor Ris_lvs2 is connected to a non-inverting input terminal of a comparator Comp and an inverting input terminal of the comparator Comp is connected to a voltage source which supplies a voltage of VDD/2. An output terminal of the comparator Comp is connected to a digital control circuit 20 and supplies a current inversion signal Sinv of the resonance current Icr to the digital control circuit 20.

The FB terminal of the control IC 10 is connected to an input terminal of an analog-to-digital converter ADC. An output terminal of the analog-to-digital converter ADC is connected to the digital control circuit 20 and supplies a digital-converted feedback signal Dfb to the digital control circuit 20.

The digital control circuit 20 has the function of inputting the current inversion signal Sinv and the feedback signal Dfb and outputting drive signals Vho and Vlo for driving the switching elements Q1 and Q2 respectively. The high-side drive signal Vho is supplied via a buffer circuit Buf1 to the HO terminal and the low-side drive signal Vlo is supplied via a buffer circuit Buf2 to the LO terminal.

An external shunt circuit including the shunt capacitor Cis and the shunt resistor Ris connected in series is connected in parallel with the resonance capacitor Cr. A signal obtained by shunting the resonance current Icr by this shunt circuit is inputted to the IS terminal of the control IC 10. The switching power supply apparatus originally includes the shunt circuit for detecting an overcurrent of the switching element Q1 or Q2. Accordingly, the shunt capacitor Cis or the shunt resistor Ris is not newly added to the control IC 10 for obtaining the current inversion signal Sinv, and is not substantially a new external additional part.

Rough operation of the switching power supply apparatus having the above structure will now be described. First a direct-current voltage Vi is applied between the input terminals IN1 and IN2 of the switching power supply apparatus. The switching operation of the switching elements Q1 and Q2 is begun by the control IC 10 at the time ratio of 50%. A switching frequency at that time is approximately equal to a resonance frequency determined by an excitation inductor included in the primary side of the transformer T1 and the resonance capacitor Cr. Power is transmitted by the switching operation of the switching elements Q1 and Q2 from the primary side to the secondary side of the transformer T1. An alternating voltage outputted to the secondary side of the transformer T1 is rectified and smoothed. As a result, a direct-current output voltage Vo is obtained and is supplied from the output terminals OUT1 and OUT2 to the load.

The output voltage Vo is detected by the shunt regulator SR1 and an error signal between the output voltage Vo and a target voltage is fed back via the photocoupler PC1 to the FB terminal of the control IC 10. Furthermore, a voltage signal is obtained by shunting a resonance current Icr flowing to the resonance capacitor Cr by the shunt capacitor Cis and the shunt resistor Ris and converting an obtained current by the shunt resistor Ris. This voltage signal corresponds to the resonance current Icr and is inputted to the IS terminal of the control IC 10.

A feedback voltage Vfb inputted to the FB terminal of the control IC 10 is converted by the analog-to-digital converter ADC to a feedback signal Dfb, which is a digital signal, and the feedback signal Dfb is inputted to the digital control circuit 20. The voltage signal corresponding to the resonance current Icr and inputted to the IS terminal is pulled up by the resistors Ris_lvs1 and Ris_lvs2 and is converted to a voltage Vis with a voltage VDD/2 as reference. The voltage Vis is compared with the voltage VDD/2 by the comparator Comp. A current inversion signal Sinv indicative of timing at which polarity inversion of the resonance current Icr of the resonance circuit occurs is supplied to the digital control circuit 20. The voltage Vis=VDD/2 after the pull-up corresponds to the resonance current Icr=0.

Rough operation of the digital control circuit 20 will now be described.

Figure 3:
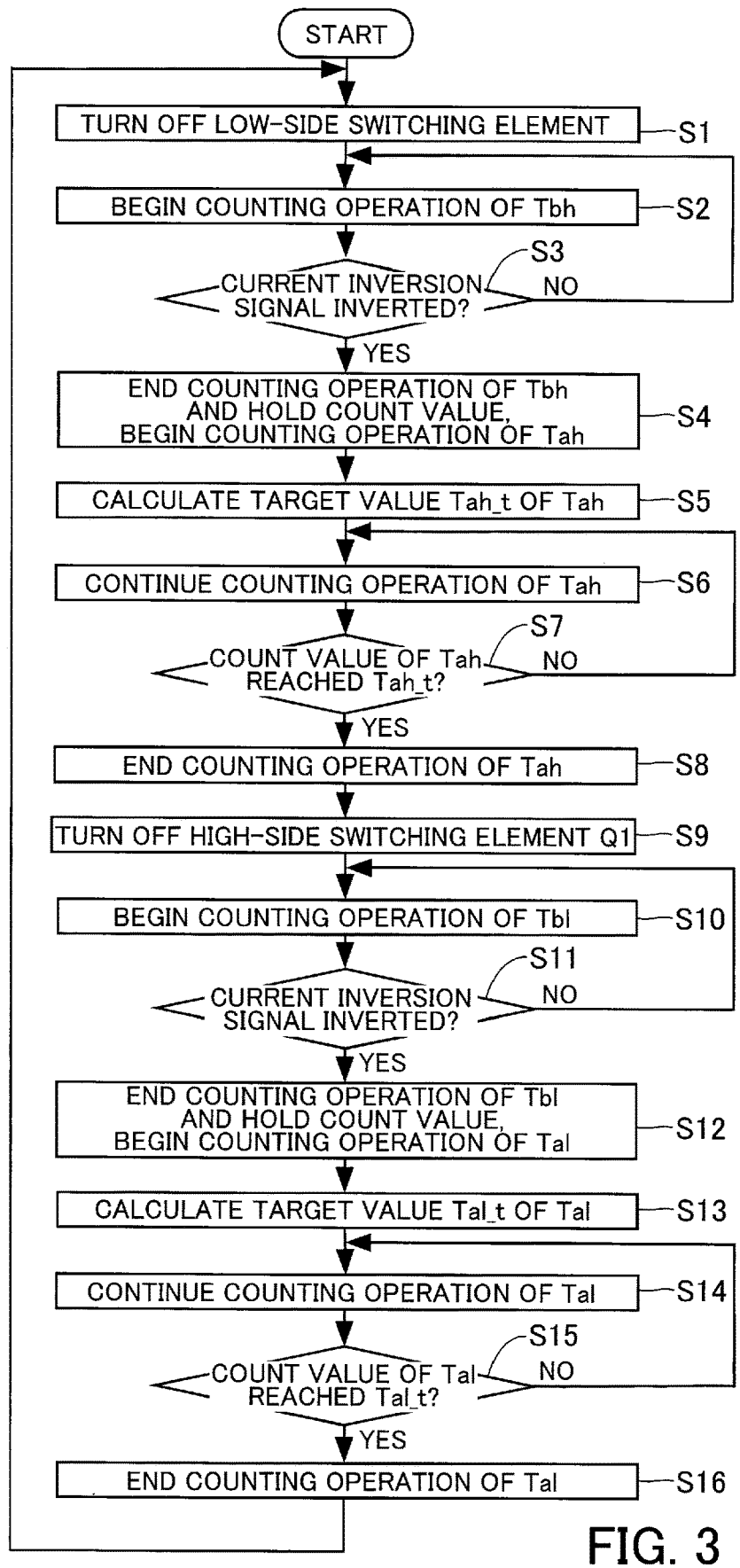
FIG. 3 is a flow chart illustrative of the operation of a digital control circuit in the first embodiment.
Figure 4:
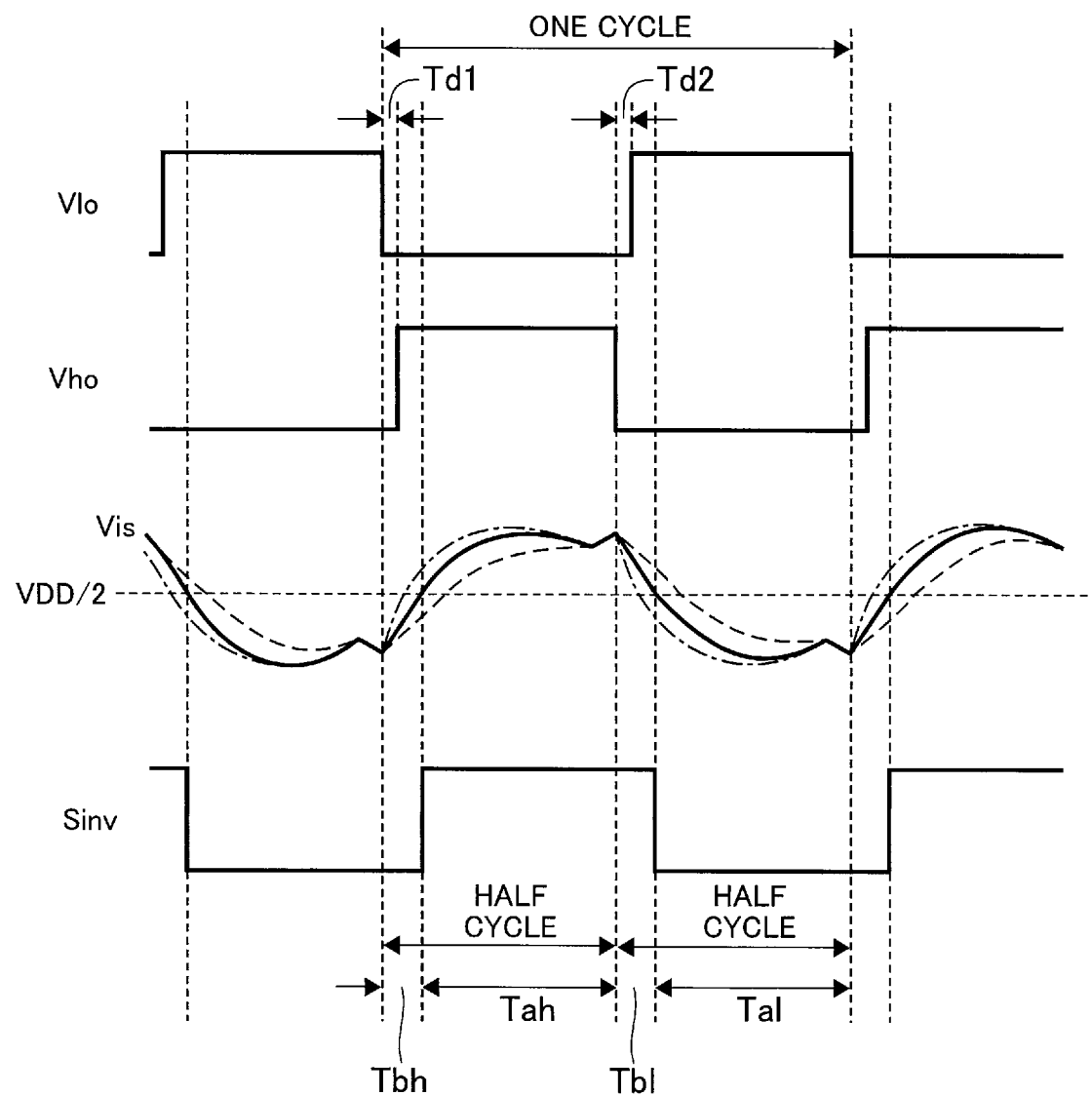
FIG. 4 illustrates examples of input and output waveforms of the digital control circuit in the first embodiment.

FIG. 3 is a flow chart illustrative of the operation of the digital control circuit in the first embodiment. FIG. 4 illustrates examples of input and output waveforms of the digital control circuit in the first embodiment.

As illustrated in FIG. 3, first the digital control circuit 20 puts a low-side drive signal Vlo into an off state and the low-side switching element Q2 is turned off (step S1). The digital control circuit 20 begins the counting operation of high-side resonance current before-inversion time Tbh with the operation of putting the low-side drive signal Vlo into the off state as a turning point (step S2).

Next, the digital control circuit 20 determines whether or not a current inversion signal Sinv has been inverted (step S3). If the current inversion signal Sinv has not been inverted, then the digital control circuit 20 continues the counting operation of the high-side resonance current before-inversion time Tbh until the current inversion signal Sinv is inverted.

Next, if the current inversion signal Sinv has been inverted, then the digital control circuit 20 ends the counting operation of the resonance current before-inversion time Tbh and holds a count value. At the same time the digital control circuit 20 begins the counting operation of high-side resonance current after-inversion time Tah (step S4).

Next, the digital control circuit 20 calculates from a feedback signal Dfb a target value Tah_t of the high-side resonance current after-inversion time Tah which is to be ended by a high-side drive signal Vho (step S5).

Next, the digital control circuit 20 continues the counting operation of the high-side resonance current after-inversion time Tah (step S6) and determines whether or not a count value of the high-side resonance current after-inversion time Tah has reached the target value Tah_t (step S7). If the count value of the high-side resonance current after-inversion time Tah has not reached the target value Tah_t, then the digital control circuit 20 continues the counting operation of the high-side resonance current after-inversion time Tah until a count value of the high-side resonance current after-inversion time Tah reaches the target value Tah_t.

When a count value of the high-side resonance current after-inversion time Tah reaches the target value Tah_t, the digital control circuit 20 ends the counting operation of the high-side resonance current after-inversion time Tah (step S8). At the same time the digital control circuit 20 changes the high-side drive signal Vho to a state indicative of turn-off and turns off the high-side switching element Q1 (step S9).

Next, the digital control circuit 20 begins the counting operation of low-side resonance current before-inversion time Tbl with the operation of putting the high-side drive signal Vho into the off state as a turning point (step S10).

Next, the digital control circuit 20 determines whether or not the current inversion signal Sinv has been inverted (step S11). If the current inversion signal Sinv has not been inverted, then the digital control circuit 20 continues the counting operation of the low-side resonance current before-inversion time Tbl until the current inversion signal Sinv is inverted.

Next, if the current inversion signal Sinv is inverted, then the digital control circuit 20 ends the counting operation of the resonance current before-inversion time Tbl and holds a count value. At the same time the digital control circuit 20 begins the counting operation of low-side resonance current after-inversion time Tal (step S12).

Next, the digital control circuit 20 calculates from the feedback signal Dfb a target value Tal_t of the low-side resonance current after-inversion time Tal which is to be ended by a low-side drive signal Vlo (step S13).

Next, the digital control circuit 20 continues the counting operation of the low-side resonance current after-inversion time Tal (step S14) and determines whether or not a count value of the low-side resonance current after-inversion time Tal has reached the target value Tal_t (step S15). If the count value of the low-side resonance current after-inversion time Tal has not reached the target value Tal_t, then the digital control circuit continues the counting operation of the low-side resonance current after-inversion time Tal until a count value of the low-side resonance current after-inversion time Tal reaches the target value Tal_t.

When a count value of the low-side resonance current after-inversion time Tal reaches the target value Tal_t, the digital control circuit 20 ends the counting operation of the low-side resonance current after-inversion time Tal (step S16). Furthermore, the process returns to step S1. At the same time that the digital control circuit 20 ends the counting operation of the low-side resonance current after-inversion time Tal, the digital control circuit 20 changes the low-side drive signal Vlo to a state indicative of turn-off and turns off the low-side switching element Q2.

In FIG. 3, control regarding turn-on of the switching element Q1 or Q2 is not illustrated. However, control is exercised so that a determined dead time after one of the switching element Q1 or Q2 is turned off, the other switching element is turned on. That is to say, as illustrated in FIG. 4, the high-side drive signal Vho becomes a high level and the high-side switching element Q1 is turned on dead time Td1 after the low-side drive signal Vlo becomes a low level and the low-side switching element Q2 is turned off. Furthermore, the low-side drive signal Vlo becomes a high level and the low-side switching element Q2 is turned on dead time Td2 after the high-side drive signal Vho becomes a low level and the high-side switching element Q1 is turned off.

The above processing functions of the digital control circuit 20 are realized by the use of a processor and a memory of a computer which the control IC 10 has. Alternatively, a field-programmable gate array (FPGA) or the like designed so as to realize the logical function illustrated in FIG. 3 is used as the control IC 10. By doing so, the processing functions of the digital control circuit 20 are realized.

The digital control circuit 20 controls in this way the ratio of resonance current Icr after-inversion time to resonance current Icr before-inversion time every half cycle by the feedback signal Dfb. The voltage Vis is a signal corresponding to a current obtained by adding up an excitation current (which does not depend on a load) and a load current. As indicated by a dot-dash line in FIG. 4, the rising of the voltage Vis becomes more abrupt as the load becomes heavier. As indicated by a dashed line in FIG. 4, the rising of the voltage Vis becomes gentler as the load becomes lighter. Accordingly, as the load becomes heavier, the resonance current before-inversion time Tbh and the resonance current before-inversion time Tbl become shorter. As the load becomes lighter, the resonance current before-inversion time Tbh and the resonance current before-inversion time Tbl become longer. Furthermore, the resonance current after-inversion time Tah and the resonance current after-inversion time Tal are controlled by the feedback signal Dfb indicative of the magnitude of the load. With the voltage Vis the resonance current before-inversion time Tbh and the resonance current before-inversion time Tbl change every half cycle according to the magnitude of the load. Therefore, responsiveness to a sudden change in the magnitude of the load, such as start time or switching of the load between a standby state and a normal operation state, is improved.

A concrete example of the structure of the digital control circuit 20 will now be described.

Figure 5:
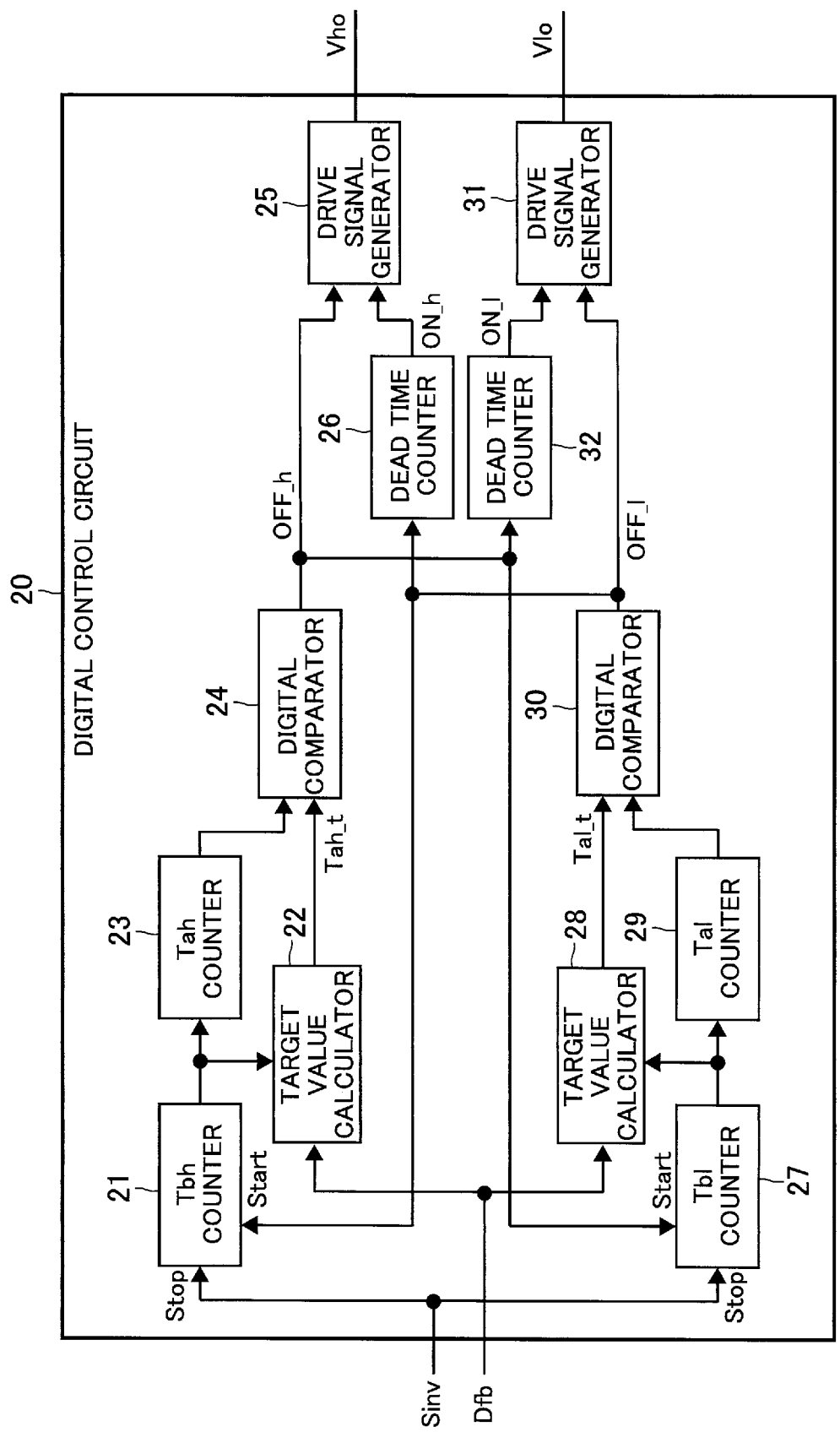
FIG. 5 is a block diagram illustrative of an example of the structure of the functions of the digital control circuit.
Figure 6:
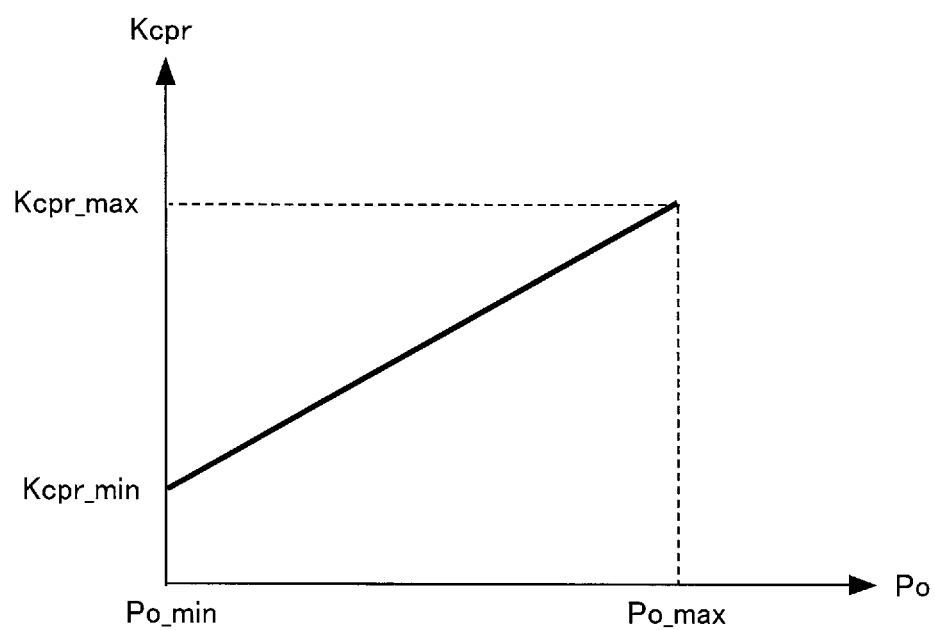
FIG. 6 illustrates the relationship between a load and a current phase ratio.
Figure 7A:
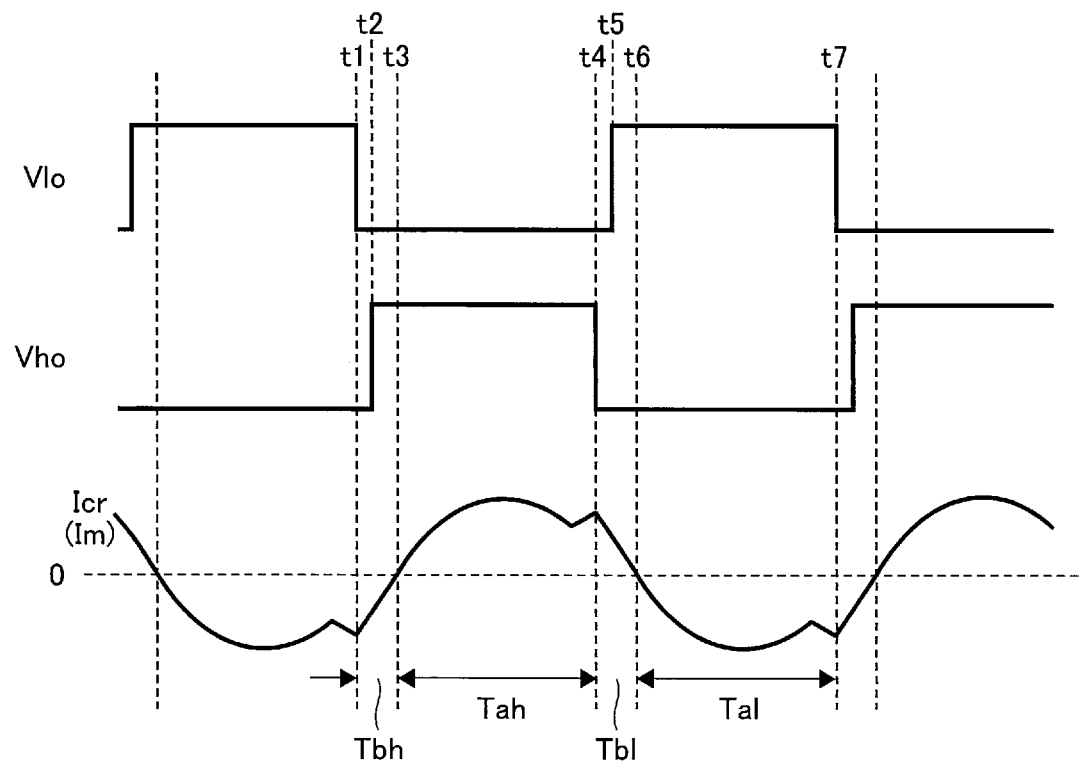
FIGS. 7A and 7B illustrate examples of operational waveforms of the digital control circuit, FIG. 7A illustrating an operational waveform at a normal control time, FIG. 7B illustrating an operational waveform at a no-load control time.
Figure 7B:
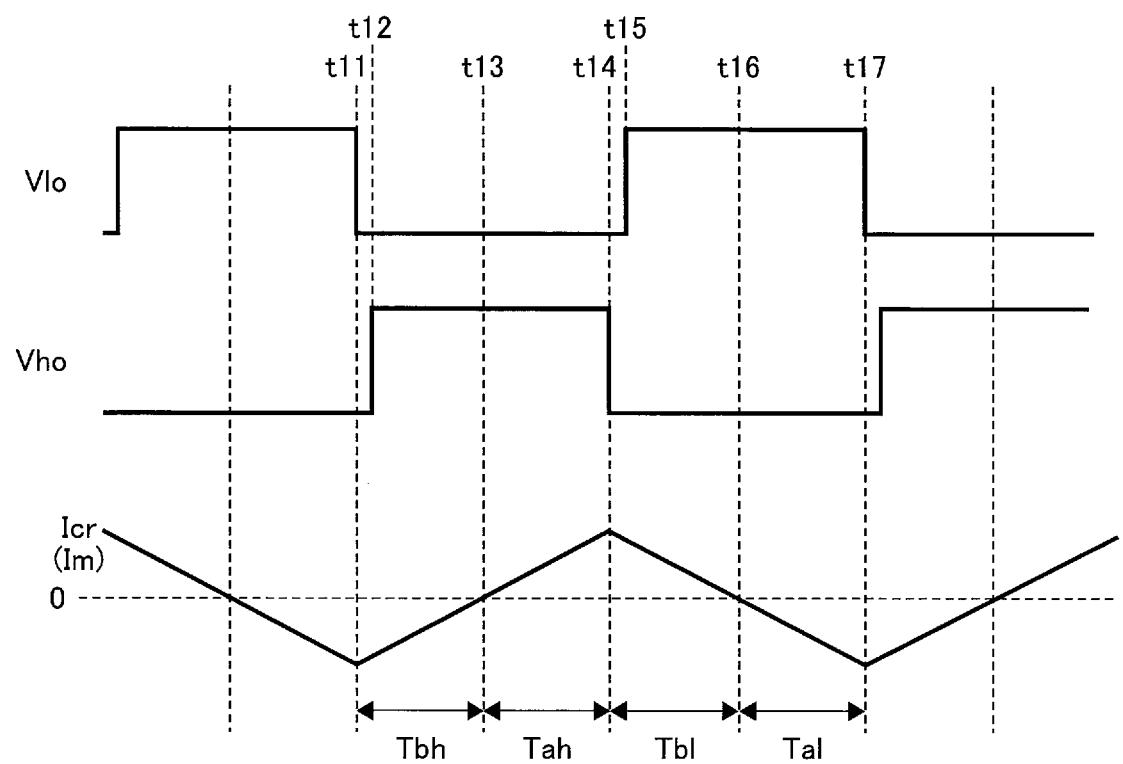

FIG. 5 is a block diagram illustrative of an example of the structure of the functions of the digital control circuit. FIG. 6 illustrates the relationship between a load and a current phase ratio. FIGS. 7A and 7B illustrate examples of operational waveforms of the digital control circuit. FIG. 7A illustrates an operational waveform at a normal control time. FIG. 7B illustrates an operational waveform at a no-load control time.

The digital control circuit 20 includes a Tbh counter 21, a target value calculator 22, a Tah counter 23, a digital comparator 24, a drive signal generator 25, and a dead time counter 26 for the high side. Furthermore, the digital control circuit 20 includes a Tbl counter 27, a target value calculator 28, a Tal counter 29, a digital comparator 30, a drive signal generator 31, and a dead time counter 32 for the low side.

The Tbh counter 21 and the Tbl counter 27 count resonance current before-inversion time Tbh and resonance current before-inversion time Tbl respectively. The output terminal of the comparator Comp is connected to Stop terminals of the Tbh counter 21 and the Tbl counter 27. A signal synchronized with the rising edge of a current inversion signal Sinv is inputted to the Stop terminal of the Tbh counter 21 and a signal synchronized with the falling edge of the current inversion signal Sinv is inputted to the Stop terminal of the Tbl counter 27.

Output terminals of the Tbh counter 21 and the Tbl counter 27 are connected to the target value calculators 22 and 28 respectively. Input terminals of the target value calculators 22 and 28 are connected to the output terminal of the analog-to-digital converter ADC. When the Tbh counter 21 and the Tbl counter 27 end counting operation, the target value calculators 22 and 28 calculate, on the basis of a feedback signal Dfb, target values Tah_t and Tal_t indicative of the length of resonance current after-inversion time Tah and resonance current after-inversion time Tal respectively.

Furthermore, the output terminals of the Tbh counter 21 and the Tbl counter 27 are connected to input terminals of the Tah counter 23 and the Tal counter 29 respectively. When the Tbh counter 21 and the Tbl counter 27 at the preceding stages end counting operation, the Tah counter 23 and the Tal counter 29 begin the counting operation of the resonance current after-inversion time Tah and the resonance current after-inversion time Tal respectively. It is desirable that the Tah counter 23 and the Tal counter 29 clear count values before the Tah counter 23 and the Tal counter 29 begin the counting operation or after the digital comparators 24 and 30 at the next stages end comparison operation.

Output terminals of the target value calculator 22 and the Tah counter 23 are connected to input terminals of the digital comparator 24. The digital comparator 24 compares a count value which the Tah counter counts with the target value Tah_t indicative of the length of the resonance current after-inversion time Tah calculated by the target value calculator 22. When they match, the digital comparator 24 outputs an off signal OFF_h. Output terminals of the target value calculator 28 and the Tal counter 29 are connected to input terminals of the digital comparator 30. The digital comparator 30 compares a count value which the Tal counter 29 counts with the target value Tal_t indicative of the length of the resonance current after-inversion time Tal calculated by the target value calculator 28. When they match, the digital comparator 30 outputs an off signal OFF_l.

An output terminal of the high-side digital comparator 24 is connected to a Start terminal of the low-side Tbl counter 27. An output terminal of the low-side digital comparator 30 is connected to a Start terminal of the high-side Tbh counter 21. Accordingly, when the off signal OFF_h is inputted, the Tbl counter 27 begins counting operation. When the off signal OFF_l is inputted, the Tbh counter 21 begins counting operation.

Furthermore, the output terminal of the high-side digital comparator 24 is connected to an input terminal of the low-side dead time counter 32. The output terminal of the low-side digital comparator 30 is connected to an input terminal of the high-side dead time counter 26. When the off signal OFF_l is inputted from the digital comparator 30, the dead time counter 26 begins the counting operation of dead time. When timing ends after a determined time, the dead time counter 26 outputs an on signal ON_h. When the off signal OFF_h is inputted from the digital comparator 24, the dead time counter 32 begins the counting operation of dead time. When timing ends after a determined time, the dead time counter 32 outputs an on signal ON_l.

The output terminal of the digital comparator 24 and an output terminal of the dead time counter 26 are connected to an input terminal of the drive signal generator 25. An output terminal of the drive signal generator 25 is connected to an input terminal of the buffer circuit Buf1. The drive signal generator 25 outputs a drive signal Vho. The drive signal Vho rises when the on signal ON_h is inputted from the dead time counter 26 to the drive signal generator 25. The drive signal Vho falls when the off signal OFF_h is inputted from the digital comparator 24 to the drive signal generator 25. The output terminal of the digital comparator 30 and an output terminal of the dead time counter 32 are connected to an input terminal of the drive signal generator 31. An output terminal of the drive signal generator 31 is connected to an input terminal of the buffer circuit Buf2. The drive signal generator 31 outputs a drive signal Vlo. The drive signal Vlo rises when the on signal ON_l is inputted from the dead time counter 32 to the drive signal generator 31. The drive signal Vlo falls when the off signal OFF_l is inputted from the digital comparator 30 to the drive signal generator 31.

In order to improve responsiveness to a sudden change in the load, the digital control circuit 20 exercises control every half cycle according to the magnitude of the load by the use of the time average of a feedback voltage Vfb (over about a half switching cycle, for example) obtained by the capacitor C6 connected to the FB terminal. Control by the digital control circuit 20 which is capable of accommodating a sudden change in the load will now be described.

First the magnitude of the load is represented by a current phase ratio Kcpr of a resonance current Icr. The current phase ratio Kcpr is the ratio of resonance current after-inversion time Tah and resonance current after-inversion time Tal to resonance current before-inversion time Tbh and resonance current before-inversion time Tbl respectively. That is to say, the current phase ratio Kcpr is given by $$Kcpr = Tah/Tbh = Tal/Tbl \qquad (1)$$

Tah/Tbh=Tal/Tbl holds in a steady state. On-off control of the high-side switching element and on-off control of the low-side switching element are exercised separately at the time of a sudden change in the load and it may be that Tah/Tbh≠Tal/Tbl.

As stated above, the rising of the voltage Vis illustrated in FIG. 4 becomes more abrupt as the load becomes heavier. Accordingly, the resonance current before-inversion time Tbh and the resonance current before-inversion time Tbl become shorter as the load becomes heavier. The resonance current before-inversion time Tbh and the resonance current before-inversion time Tbl become longer as the load becomes lighter. As apparent from this, the current phase ratio Kcpr in the above expression (1) represents the magnitude of the load. The load becomes heavier as the high-side resonance current before-inversion time Tbh and the low-side resonance current before-inversion time Tbl become shorter (the resonance current after-inversion time Tah and the resonance current after-inversion time Tal become longer).

A graph in FIG. 6 indicates the relationship between the magnitude of the load (Po) and the current phase ratio Kcpr. This graph is obtained by connecting a point corresponding to no-load Po_min and a point corresponding to a maximum load Po_max by a straight line. Furthermore, it is assumed that there is a proportional relationship between the magnitude of the load Po and a feedback voltage Vfb. There is not always a linear relationship illustrated in FIG. 6 between the magnitude of the load Po and the current phase ratio Kcpr. However, the relationship between the magnitude of the load Po and the current phase ratio Kcpr is roughly approximated by a linear relationship. Similarly, there is not always a completely proportional relationship between the magnitude of the load Po and the feedback voltage Vfb. However, this relationship holds as a first approximation. In addition, even if an exact value of the current phase ratio Kcpr relative to the magnitude of the load Po deviates from the graph or the relationship between the magnitude of the load Po and the feedback voltage Vfb deviates from a proportional relationship, the feedback voltage Vfb changes according to the deviation and the current phase ratio Kcpr is adjusted. Accordingly, an output voltage Vo is ultimately set to a constant voltage.

The relationship at this time between the feedback voltage Vfb and the current phase ratio Kcpr is represented by $$Vfb = Kcpr/A + B \quad (2)$$

where A and B are constants.

From the above expressions (1) and (2), the following expressions are obtained:

$$Tah = (Vfb - B) \cdot A \cdot Tbh \quad (3)$$

$$Tal = (Vfb - B) \cdot A \cdot Tbl \quad (4)$$

The resonance current after-inversion time Tah and the resonance current after-inversion time Tal found from expressions (3) and (4) are equal to the target values Tah_t and Tal_t calculated by the target value calculators 22 and 28 respectively.

The constants A and B are determined from the resonance current before-inversion time Tbh, the resonance current after-inversion time Tah, the resonance current before-inversion time Tbl, and the resonance current after-inversion time Tal so as to satisfy expression (2). That is to say, first the following expression is obtained from expression (3):

$$A \cdot (Vfb - B) = Tah/Tbh \quad (5)$$

Furthermore, the range of Tah/Tbh (=Kcpr) and the range of the feedback voltage Vfb corresponding to it are determined at the stage of system design (specification determination). The minimum value (=Kcpr min) of Tah/Tbh is 1. This minimum value is obtained at no-load time, that is to say, when the resonance current Icr includes only an excitation current. It is assumed that the maximum value of Tah/Tbh is, for example, 10. Next, the minimum value Vfb_min and the maximum value Vfb_max of the feedback voltage Vfb corresponding to the minimum value and the maximum value, respectively, of Tah/Tbh are determined. The minimum value Vfb_min and the maximum value Vfb_max are set at the FB terminal of the control IC 10 in this embodiment. For example, Vfb_min=1V and Vfb_max=3V. Simultaneous equations are obtained by substituting these values in the above expression (5). The constants A and B are found by solving the simultaneous equations. The case of the high side has been described. The same applies to the case of the low side.

In addition, if the constants A and B are considered as a constant k to simplify further description of control, then the above expressions (3) and (4) are expressed as:

$$Tah = k \cdot Vfb \cdot Tbh \quad (6)$$

$$Tal = k \cdot Vfb \cdot Tbl \quad (7)$$

That is to say, the resonance current after-inversion time Tah is determined by the multiplication of the resonance current before-inversion time Tbh and the feedback voltage Vfb and the resonance current after-inversion time Tal is determined by the multiplication of the resonance current before-inversion time Tbl and the feedback voltage Vfb.

The operation at a normal control time of the digital control circuit 20 illustrated in FIG. 5 will now be described with reference to FIG. 7A. For example, it is assumed that a low-side drive signal Vlo is in an on state which instructs the switching element Q2 to keep an on state and that a high-side drive signal Vho is in an off state which instructs the switching element Q1 to keep an off state. In this state, it is assumed that at time t1, the digital comparator 30 outputs an off signal OFF_l and the drive signal generator 31 outputs a drive signal Vlo for turning off the switching element Q2. At the time t1, the Tbh counter 21 begins counting operation and the dead time counter 26 also begins counting operation, with the output of the off signal OFF_l by the digital comparator 30 as a turning point.

At time t2 the dead time counter 26 ends timing and outputs an on signal ON_h. At this time the drive signal Vho outputted by the drive signal generator 25 makes the transition from the off state to an on state.

Next, at time t3 a current inversion signal Sinv indicative of the polarity inversion of a resonance current Icr from a minus to a plus is inputted to the Tbh counter 21. At this time the Tbh counter 21 ends the counting operation. The target value calculator 22 calculates a target value Tah_t and the Tah counter 23 begins counting operation, with the ending of the counting operation by the Tbh counter 21 as a turning point. If the processing speed of the digital control circuit 20 is sufficiently fast, then the Tah counter 23 may begin counting operation after the target value calculator 22 calculates the target value Tah_t. However, if the processing speed of the digital control circuit 20 is slow, then it is desirable to simultaneously begin the calculation of the target value Tah_t by the target value calculator 22 and the counting operation by the Tah counter 23 and to perform parallel processing.

Next, at time t4 a count value of the Tah counter 23 reaches the target value Tah_t calculated by the target value calculator 22. At this time the digital comparator 24 outputs an off signal OFF_h. Accordingly, the drive signal generator 25 outputs a drive signal Vho for turning off the switching element Q1. Furthermore, the off signal OFF_h is supplied to the low-side Tbl counter 27 and the low-side dead time counter 32. As a result, the Tbl counter 27 begins counting operation and the dead time counter 32 also begins counting operation.

Control operation performed in the next half cycle is the same as the high-side control operation. That is to say, at time t5 the dead time counter 32 ends timing. At this time the drive signal Vlo makes the transition from the off state to an on state. At time t6 the Tbl counter 27 ends the counting operation. The target value calculator 28 calculates a target value Tal_t and the Tal counter 29 begins counting operation, with the ending of the counting operation by the Tbl counter 27 as a turning point. At time t7 a count value of the Tal counter 29 reaches the target value Tal_t calculated by the target value calculator 28. At this time the digital comparator outputs an off signal OFF_l. Accordingly, the drive signal generator 31 outputs a drive signal Vlo for turning off the switching element Q2. The control exercised from the time t1 to the time t7 is repeated after the time t7.

When the digital control circuit 20 exercises no-load control, the resonance current Icr of the LLC current resonance converter includes only an excitation current Im not related to power transmission from the primary side to the secondary side. In this case, as illustrated in FIG. 7B, the excitation current Im changes linearly. That is to say, at time t11, the digital comparator 30 outputs an off signal OFF_l and the drive signal generator 31 outputs a drive signal Vlo in an off state. At this time, the Tbh counter 21 begins counting operation and the dead time counter 26 also begins counting operation.

At time t12 the dead time counter 26 ends timing and outputs an on signal ON_h. At this time a drive signal Vho outputted by the drive signal generator 25 makes the transition from an off state to an on state.

At time t13 polarity inversion of the resonance current Icr occurs. At this time, the Tbh counter 21 ends the counting operation, the target value calculator 22 calculates a target value Tah_t, and the Tah counter 23 begins counting operation.

At time t14 a count value of the Tah counter 23 reaches the target value Tah_t calculated by the target value calculator 22. At this time, the digital comparator outputs an off signal OFF_h and the drive signal generator 25 outputs a drive signal Vho for turning off the switching element Q1. At the time t14, the low-side Tbl counter 27 begins counting operation and the dead time counter 32 also begins counting operation.

At time t15 the dead time counter 32 ends timing. At this time the drive signal Vlo makes the transition from the off state to an on state. At time t16 polarity inversion of the resonance current Icr occurs. At this time, the Tbl counter 27 ends the counting operation. Furthermore, at this time, the target value calculator 28 calculates a target value Tal_t and the Tal counter 29 begins counting operation. At time t17 a count value of the Tal counter 29 reaches the target value Tal_t calculated by the target value calculator 28. At this time, the digital comparator 30 outputs an off signal OFF_l and the drive signal generator 31 outputs a drive signal Vlo in an off state. The control exercised from the time t11 to the time t17 is repeated after the time t17.

As has been described, if the load state of the switching power supply apparatus suddenly changes, for example, from a no-load state to a normal load state, the digital control circuit 20 momentarily switches control from the state of FIG. 7B to the state of FIG. 7A by the half cycle. By doing so, the digital control circuit 20 is capable of exercising follow-up control at the time of a change in load without a response delay. Furthermore, as apparent from the above expressions (6) and (7), an operating point of an FB voltage does not depend on an input voltage of a power supply or the LC constant of a resonance circuit. Accordingly, there is no need to design power supply constants according to switching power supply apparatuses which differ in specification. This improves the flexibility of the design of power supply constants.

Second Embodiment

A switching power supply apparatus according to a second embodiment differs from the switching power supply apparatus according to the first embodiment in how to find resonance current after-inversion time Tah and resonance current after-inversion time Tal. That is to say, with the switching power supply apparatus according to the first embodiment, resonance current after-inversion time Tah and resonance current after-inversion time Tal are calculated on the basis of the multiplication of resonance current before-inversion time Tbh and resonance current before-inversion time Tbl as time information obtained by performing counting from the time when a half cycle begins and an FB voltage obtained at the time of the beginning of the half cycle. With the second embodiment, on the other hand, average time obtained by averaging time of the last continuous half cycles is used as time information obtained by performing counting from the time when a half cycle begins. To be concrete, with the second embodiment resonance current after-inversion time Tah and resonance current after-inversion time Tal are calculated on the basis of the multiplication of this average time and an FB voltage obtained at the time of the beginning of a half cycle. The whole structure of the switching power supply apparatus according to the second embodiment and the structure of a control IC are the same as the whole structure of the switching power supply apparatus according to the first embodiment (FIG. 1) and the structure of the control IC 10 (FIG. 2) respectively. Therefore, with the switching power supply apparatus according to the second embodiment description will begin with the operation of a digital control circuit included in a control IC 10.

Figure 8:
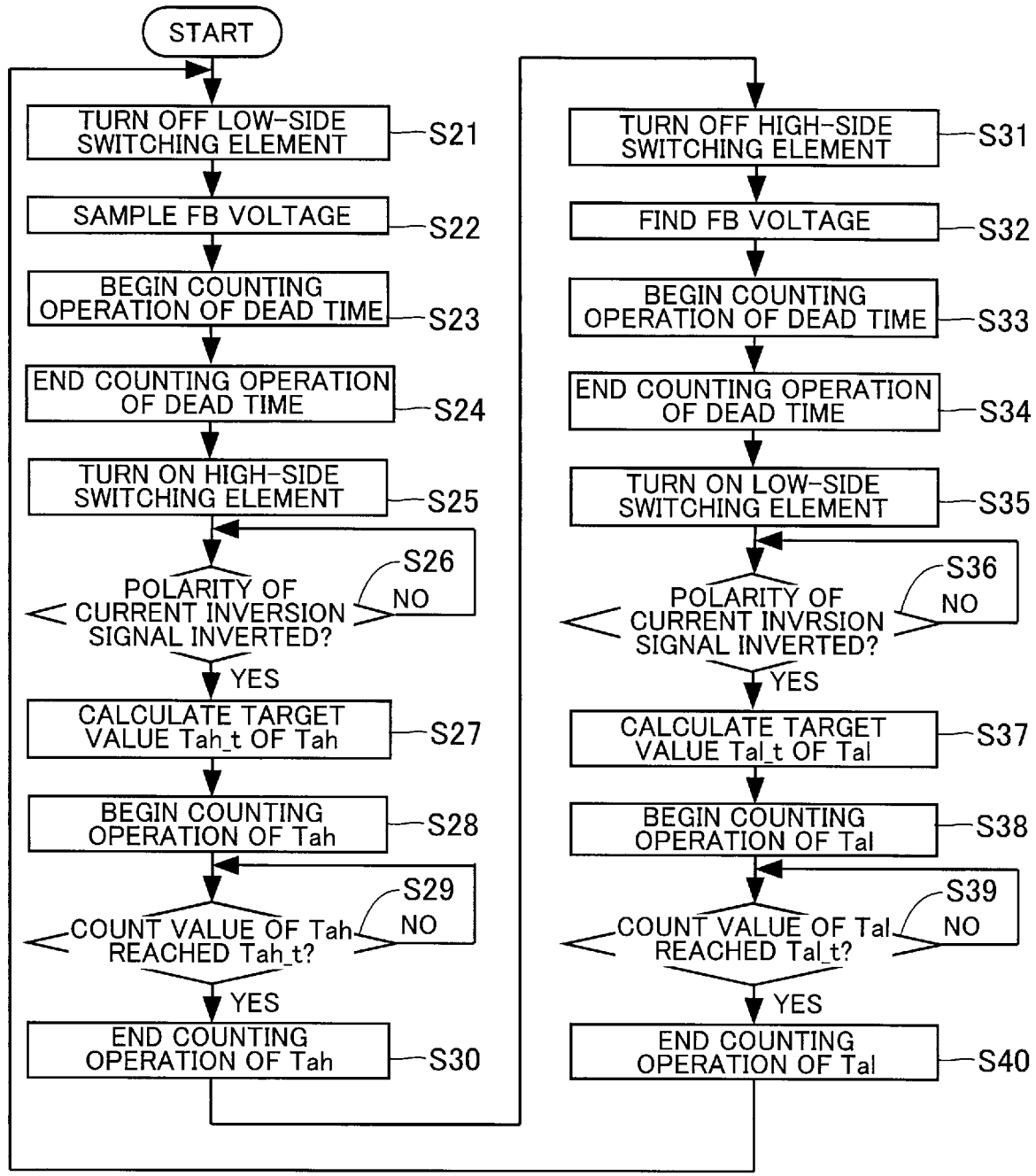
FIG. 8 is a flow chart illustrative of the switching operation of a digital control circuit in a second embodiment.
Figure 9:
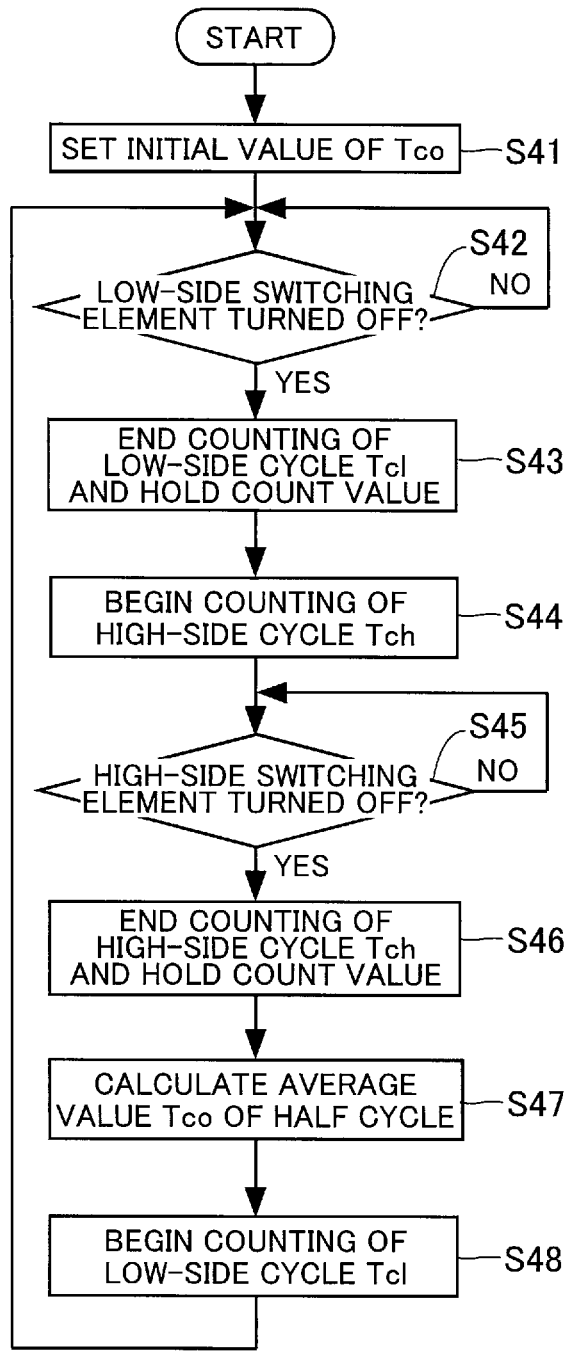
FIG. 9 is a flow chart illustrative of a half-cycle average value calculation operation in the second embodiment.
Figure 10:
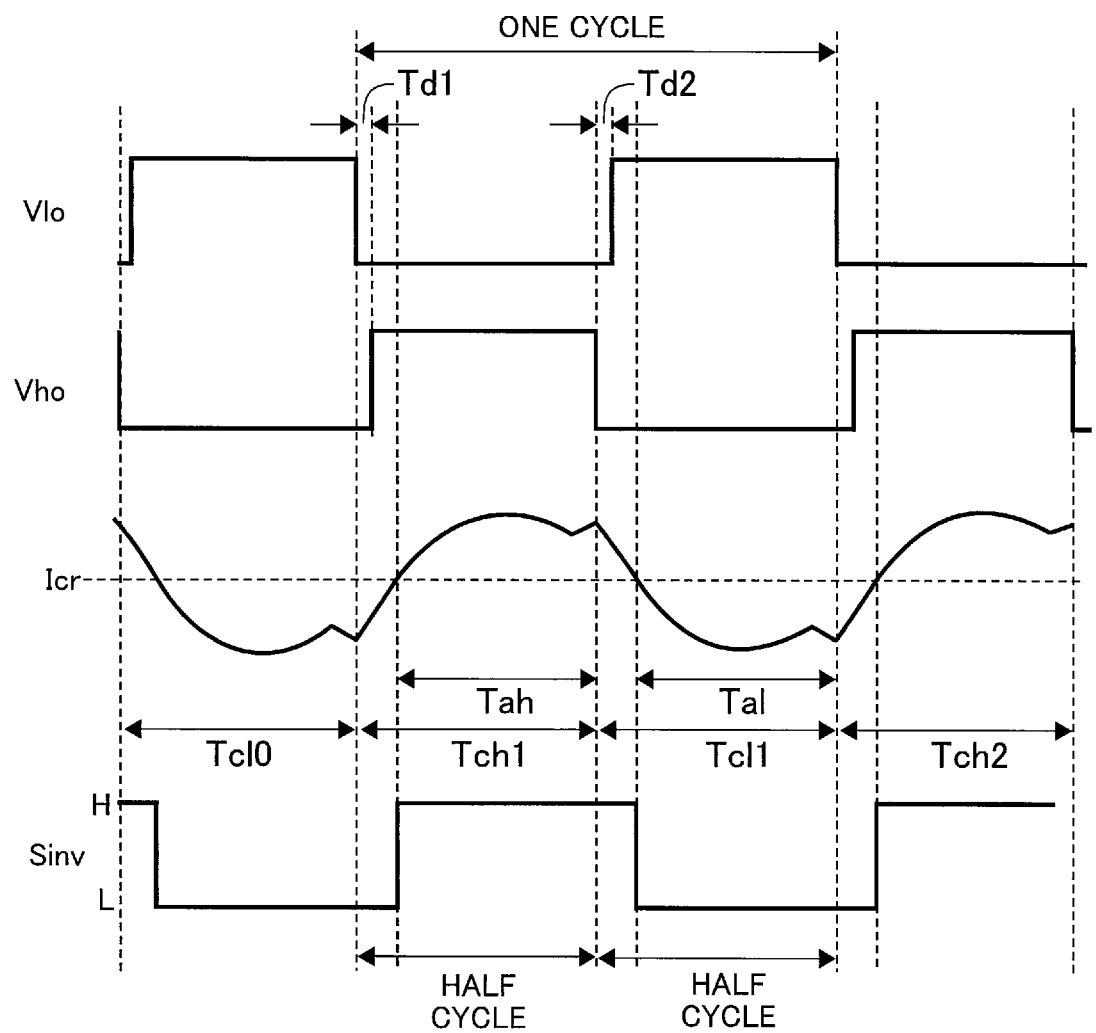
FIG. 10 illustrates examples of input and output waveforms of the digital control circuit in the second embodiment.

FIG. 8 is a flow chart illustrative of the switching operation of the digital control circuit in the second embodiment. FIG. 9 is a flow chart illustrative of half-cycle average value calculation operation in the second embodiment. FIG. 10 illustrates examples of input and output waveforms of the digital control circuit in the second embodiment.

First a digital control circuit 20a puts a low-side drive signal Vlo into an off state and a low-side switching element Q2 is turned off. As a result, switching operation is begun (step S21). FIG. 10 illustrates input and output waveforms of the digital control circuit 20a not at the time of the beginning of the switching operation but after the beginning of the switching operation. When the digital control circuit 20a puts the low-side drive signal Vlo into the off state, the digital control circuit 20a samples a feedback signal Dfb and finds an FB voltage Vfbh for calculating high-side resonance current after-inversion time Tah (step S22).

Next, the digital control circuit 20a begins the counting operation of dead time (step S23). The digital control circuit 20a ends the counting operation of the dead time after a determined time (Step S24). At the same time that the digital control circuit 20a ends the counting operation of the dead time, the digital control circuit 20a changes a high-side drive signal Vho to a state indicative of on and turns on a high-side switching element Q1 (step S25).

Next, the digital control circuit 20a determines whether or not the polarity of a current inversion signal Sinv has been inverted from a minus to a plus (step S26). If the polarity of the current inversion signal Sinv has not been inverted from a minus to a plus, then the digital control circuit 20a waits until the polarity of the current inversion signal Sinv is inverted from a minus to a plus.

Next, if the polarity of the current inversion signal Sinv has been inverted from a minus to a plus, then the digital control circuit 20a calculates a target value Tah_t of the high-side resonance current after-inversion time Tah (step S27). The target value Tah_t of the high-side resonance current after-inversion time Tah is calculated by $$Tah\_t = k \cdot Vfbh \cdot Tco \quad (8)$$

where k is a constant, Vfbh is the FB voltage found by sampling in step S22, and Tco is a half-cycle average value found by half-cycle average value calculation operation illustrated in FIG. 9 and performed in parallel with the switching operation. Next, the digital control circuit 20a begins the counting operation of the high-side resonance current after-inversion time Tah (step S28). The counting operation of the high-side resonance current after-inversion time Tah and the calculation of the target value Tah_t after the polarity inversion of the current inversion signal Sinv may be begun at the same time.

Next, the digital control circuit 20a determines whether or not a count value of the high-side resonance current after-inversion time Tah has reached the target value Tah_t (step S29). If a count value of the high-side resonance current after-inversion time Tah has not reached the target value Tah_t, then the digital control circuit 20a continues the counting operation of the high-side resonance current after-inversion time Tah until a count value of the high-side resonance current after-inversion time Tah reaches the target value Tah_t.

When a count value of the high-side resonance current after-inversion time Tah reaches the target value Tah_t and $$Tah = k \cdot Vfbh \cdot Tco \quad (9)$$

is found, the digital control circuit 20a ends the counting operation of the high-side resonance current after-inversion time Tah (step S30). Furthermore, at the same time the digital control circuit 20a changes the high-side drive signal Vho to a state indicative of off and turns off the high-side switching element Q1 (step S31).

Next, the digital control circuit 20a samples the feedback signal Dfb and finds an FB voltage Vfbl for calculating low-side resonance current after-inversion time Tal (step S32).

Next, the digital control circuit 20a begins the counting operation of dead time (step S33). The digital control circuit 20a ends the counting operation of the dead time after a determined time (Step S34). At the same time that the digital control circuit 20a ends the counting operation of the dead time, the digital control circuit 20a changes the low-side drive signal Vlo to a state indicative of on and turns on the low-side switching element Q2 (step S35).

Next, the digital control circuit 20a determines whether or not the polarity of the current inversion signal Sinv has been inverted from a plus to a minus (step S36). If the polarity of the current inversion signal Sinv has not been inverted from a plus to a minus, then the digital control circuit 20a waits until the polarity of the current inversion signal Sinv is inverted from a plus to a minus.

Next, if the polarity of the current inversion signal Sinv has been inverted from a plus to a minus, then the digital control circuit 20a calculates a target value Tal_t of the low-side resonance current after-inversion time Tal (step S37). The target value Tal_t of the low-side resonance current after-inversion time Tal is calculated by $$Tal\_t = k \cdot Vfbl \cdot Tco \quad (10)$$

where k is a constant, Vfbl is the FB voltage found by sampling in step S32, and Tco is a half-cycle average value found by the half-cycle average value calculation operation illustrated in FIG. 9. Next, the digital control circuit 20a begins the counting operation of the low-side resonance current after-inversion time Tal (step S38). The counting operation of the low-side resonance current after-inversion time Tal and the calculation of the target value Tal_t after the polarity inversion of the current inversion signal Sinv may be begun at the same time.

Next, the digital control circuit 20a determines whether or not a count value of the low-side resonance current after-inversion time Tal has reached the target value Tal_t (step S39). If a count value of the low-side resonance current after-inversion time Tal has not reached the target value Tal_t, then the digital control circuit 20a continues the counting operation of the low-side resonance current after-inversion time Tal until a count value of the low-side resonance current after-inversion time Tal reaches the target value Tal_t.

When a count value of the low-side resonance current after-inversion time Tal reaches the target value Tal_t and $$Tal = k \cdot Vfbl \cdot Tco \quad (11)$$

is found, the digital control circuit 20a ends the counting operation of the low-side resonance current after-inversion time Tal (step S40). Next, the switching operation returns to step S21 and the process from steps S21 through S40 is repeated.

The process for calculating a half-cycle average value Tco illustrated in FIG. 9 will now be described.

First the digital control circuit 20a sets an initial value of a half-cycle average value Tco at the time of starting the switching power supply apparatus (step S41). In this case, a temporary count value of a half cycle is set in an empty register in which a count value of a half cycle is to be stored so that the average value Tco of a half cycle may be found from just after starting the switching power supply apparatus. The value of a minimum half cycle which maximizes a switching frequency is set as the temporary count value. As a result, soft start of the switching power supply apparatus is realized.

Next, the digital control circuit 20a determines whether or not the low-side switching element Q2 is turned off (step S42). If the low-side switching element Q2 is not turned off, then the digital control circuit 20a waits until the low-side switching element Q2 is turned off.

Next, if the digital control circuit 20a determines that the low-side switching element Q2 is turned off, then the digital control circuit 20a ends the counting of a low-side cycle Tcl and holds a count value (step S43). Furthermore, at the same time the digital control circuit 20a begins the counting of a high-side cycle Tch (step S44).

Next, the digital control circuit 20a determines whether or not the high-side switching element Q1 is turned off (step S45). If the high-side switching element Q1 is not turned off, then the digital control circuit 20a waits until the high-side switching element Q1 is turned off.

Next, if the digital control circuit 20a determines that the high-side switching element Q1 is turned off, then the digital control circuit 20a ends the counting of the high-side cycle Tch and holds a count value (step S46).

The count values corresponding to a last one cycle are obtained in this way. The digital control circuit 20a calculates the average value Tco of a half cycle in the switching operation from these count values and count values of a determined number of continuous cycles already obtained (step S47). The average value Tco of low-side and high-side half cycles is represented by $$Tco = \frac{1}{N}\sum_{i=0}^{N-1} \frac{Tchi + Tcli}{2} \quad (12)$$

where N is the number of switching cycles to be averaged, Tcli is the width of a low-side half cycle (from the time when the high-side switching element Q1 is turned off to the time when the low-side switching element Q2 is turned off), and Tchi is the width of a high-side half cycle (from the time when the low-side switching element Q2 is turned off to the time when the high-side switching element Q1 is turned off). The average value Tco may simply be calculated from average time corresponding to half of the length of one cycle before the beginning of the half cycle.

Next, the digital control circuit 20a begins the counting of a low-side cycle Tcl (step S48). Next, the process for calculating the half-cycle average value Tco returns to step S42 and the process from step S42 through step S48 is repeated.

The above processing functions of the digital control circuit 20a are realized by the use of a processor and a memory of a computer which the control IC 10 has. Alternatively, an FPGA or the like designed so as to realize the logical functions illustrated in FIGS. 8 and 9 is used as the control IC 10. By doing so, the processing functions of the digital control circuit 20a are realized.

The digital control circuit 20a controls in this way the average time of the last continuous half cycles every half switching cycle by the FB voltages Vfbl and Vfbh. By calculating the low-side resonance current after-inversion time Tal and the high-side resonance current after-inversion time Tah every half switching cycle, the digital control circuit 20a improves responsiveness to a sudden change in the load. Furthermore, a value itself by which the FB voltages Vfbl and Vfbh are multiplied at the time of calculating the resonance current after-inversion time Tal and the resonance current after-inversion time Tah, respectively, is average time and does not change suddenly. Accordingly, the digital control circuit 20a exercises comparatively stable control.

A concrete example of the structure of the digital control circuit 20a will now be described.

Figure 11:
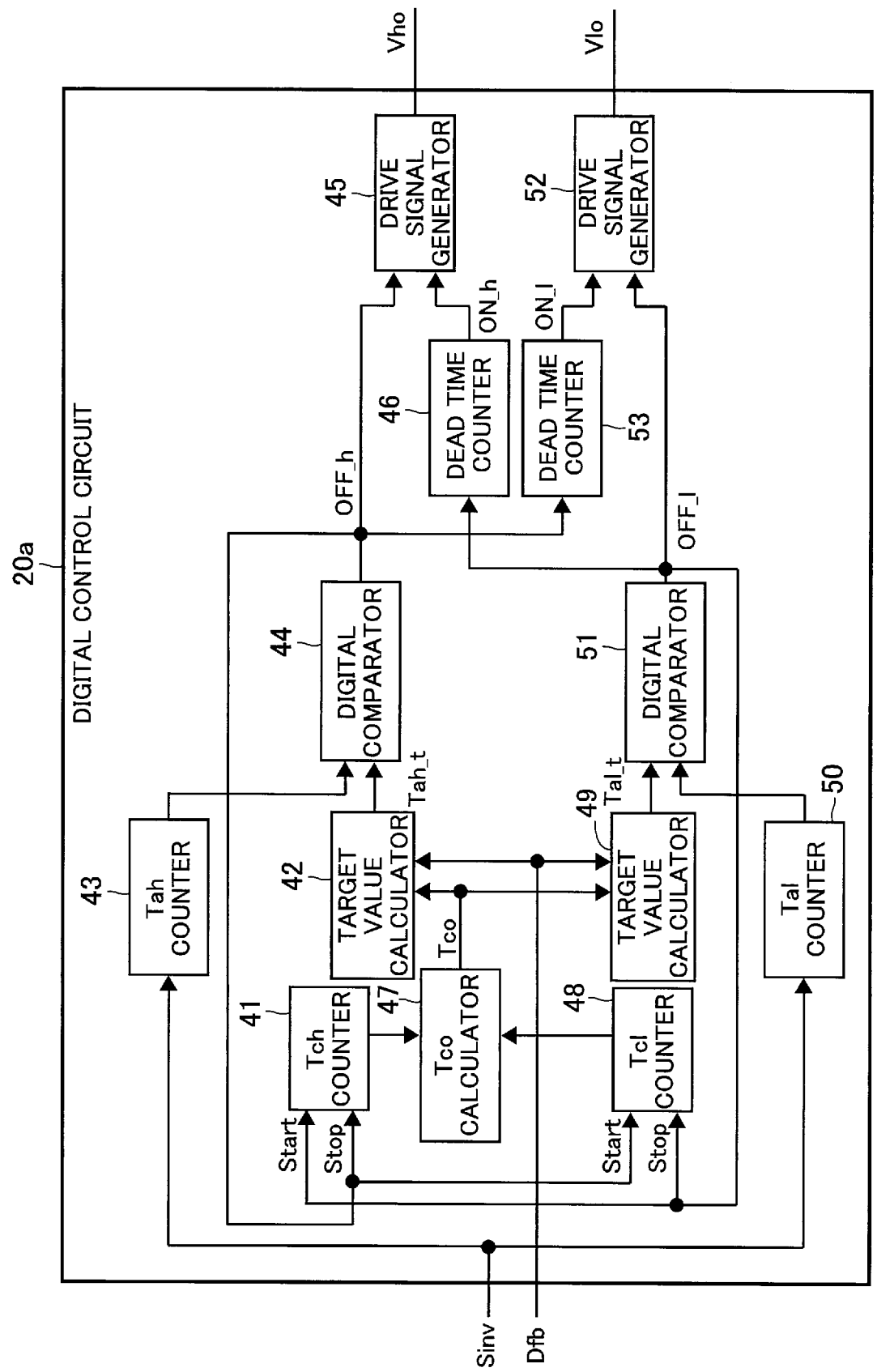
FIG. 11 is a block diagram illustrative of an example of the structure of the functions of the digital control circuit in the second embodiment.
Figure 12:
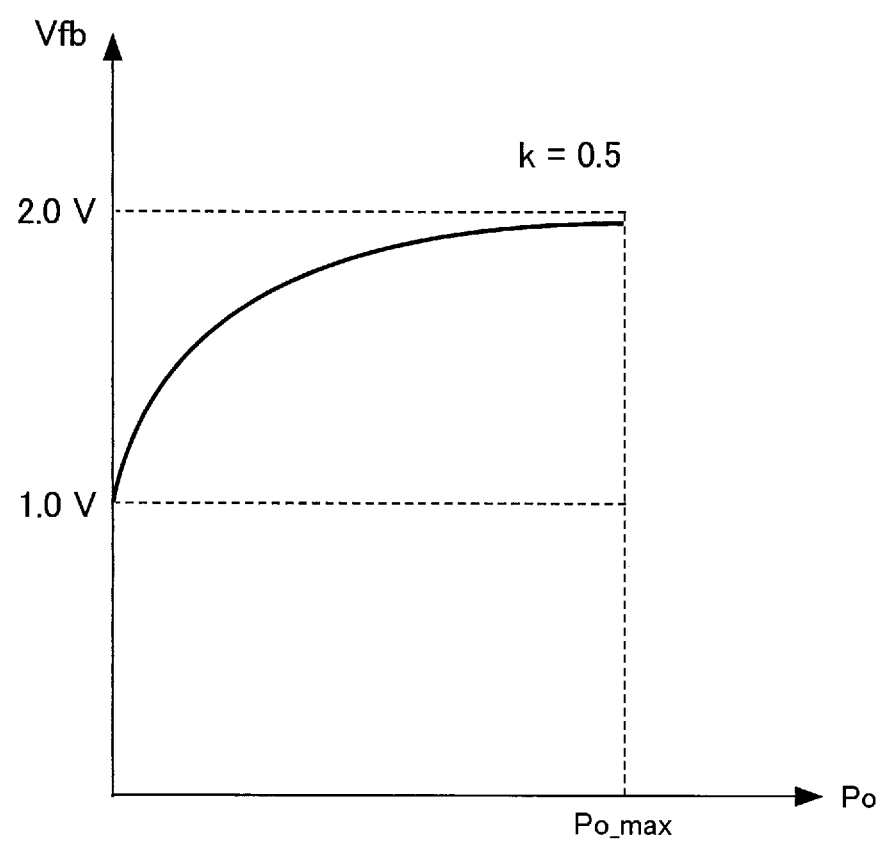
FIG. 12 illustrates the relationship between an FB voltage and a load.

FIG. 11 is a block diagram illustrative of an example of the structure of the functions of the digital control circuit in the second embodiment. FIG. 12 illustrates the relationship between an FB voltage and a load.

The digital control circuit 20a includes a Tch counter 41, a target value calculator 42, a Tah counter 43, a digital comparator 44, a drive signal generator 45, and a dead time counter 46 for the high side. Furthermore, the digital control circuit 20a includes a Tco calculator 47 for the high side and the low side. In addition, the digital control circuit 20a includes a Tcl counter 48, a target value calculator 49, a Tal counter 50, a digital comparator 51, a drive signal generator 52, and a dead time counter 53 for the low side.

The Tch counter 41 counts a high-side cycle Tch. An output terminal of the digital comparator 44 is connected to a Stop terminal of the Tch counter 41. An output terminal of the digital comparator 51 is connected to a Start terminal of the Tch counter 41. The Tcl counter 48 counts a low-side cycle Tcl. The output terminal of the digital comparator 51 is connected to a Stop terminal of the Tcl counter 48. The output terminal of the digital comparator 44 is connected to a Start terminal of the Tcl counter 48. Output terminals of the Tch counter 41 and the Tcl counter 48 are connected to an input terminal of the Tco calculator 47.

The Tco calculator 47 calculates a half-cycle average value Tco. An output terminal of the Tco calculator 47 is connected to first input terminals of the target value calculators 42 and 49. Second input terminals of the target value calculators 42 and 49 are connected to an output terminal of an analog-to-digital converter ADC so as to input a feedback signal Dfb. The target value calculators 42 and 49 input the half-cycle average value Tco from the Tco calculator 47 and the feedback signal Dfb (FB voltage) and output target values Tah_t and Tal_t respectively.

For example, the Tco calculator 47 includes N registers for the high side and N registers for the low side. Each time half-cycle data are calculated, the Tco calculator 47 successively holds them. As a result, the Tco calculator 47 always holds 2N pieces of the newest data. Each time the 2N newest pieces of data are held, the half-cycle average value Tco is found by adding up these pieces of data and dividing an obtained value by 2N. That is to say, the half-cycle average value Tco is a moving average value. The half-cycle average value Tco is used by both of the target value calculators 42 and 49 for calculating the target values Tah_t and Tal_t respectively.

Furthermore, the feedback signal Dfb inputted to the target value calculators 42 and 49 changes according to the magnitude of a load Po. That is to say, as illustrated in FIG. 12, there is the following relationship between a Vfb voltage (FB voltage) and the magnitude of a load Po. As the magnitude of a load Po increases, the Vfb voltage (FB voltage) is saturated. In this embodiment the dynamic range of the FB voltage is set to 1.0 to 2.0 volts (V). In this case, the ratio of resonance current after-inversion time Ta to a half-cycle average value Tco (Ta/Tco) is 0.5 to 1. Therefore, the constant k=0.5 from expressions (9) and (11).

Input terminals of the Tah counter 43 and the Tal counter 50 are connected to an output terminal of a comparator Comp so as to input a current inversion signal Sinv. An output terminal of the Tah counter 43 is connected to a first input terminal of the digital comparator 44 and an output terminal of the Tal counter 50 is connected to a first input terminal of the digital comparator 51. A second input terminal of the digital comparator 44 is connected to an output terminal of the target value calculator 42 and a second input terminal of the digital comparator 51 is connected to an output terminal of the target value calculator 49.

The digital comparator 44 compares a count value which the Tah counter 43 counts with the target value Tah_t calculated by the target value calculator 42 and indicative of the length of resonance current after-inversion time Tah. When they match, the digital comparator 44 outputs a high-side off signal OFF_h. The digital comparator 51 compares a count value which the Tal counter 50 counts with the target value Tal_t calculated by the target value calculator 49 and indicative of the length of resonance current after-inversion time Tal. When they match, the digital comparator 51 outputs a low-side off signal OFF_l.

The off signal OFF_h outputted by the high-side digital comparator 44 is used for beginning the counting operation of the Tcl counter 48 and stopping the counting operation of the Tch counter 41. The off signal OFF_l outputted by the low-side digital comparator 51 is used for beginning the counting operation of the Tch counter 41 and stopping the counting operation of the Tcl counter 48.

Furthermore, the output terminal of the high-side digital comparator 44 is connected to an input terminal of the low-side dead time counter 53 and the output terminal of the low-side digital comparator 51 is connected to an input terminal of the high-side dead time counter 46. When the off signal OFF_l is inputted from the digital comparator 51 to the dead time counter 46, the dead time counter 46 begins the counting operation of dead time. When the dead time counter 46 ends timing after a determined time, the dead time counter 46 outputs an on signal ON_h. When the off signal OFF_h is inputted from the digital comparator 44 to the dead time counter 53, the dead time counter 53 begins the counting operation of dead time. When the dead time counter 53 ends timing after a determined time, the dead time counter 53 outputs an on signal ON_l.

The output terminal of the digital comparator 44 and an output terminal of the dead time counter 46 are connected to an input terminal of the drive signal generator 45 and an output terminal of the drive signal generator 45 is connected to an input terminal of a buffer circuit Buf1. When the on signal ON_h is inputted from the dead time counter 46 to the drive signal generator 45, the drive signal generator 45 outputs a drive signal Vho which rises. When the off signal OFF_h is inputted from the digital comparator 44 to the drive signal generator 45, the drive signal generator 45 outputs a drive signal Vho which falls. The output terminal of the digital comparator 51 and an output terminal of the dead time counter 53 are connected to an input terminal of the drive signal generator 52 and an output terminal of the drive signal generator 52 is connected to an input terminal of a buffer circuit Buf2. When the on signal ON_l is inputted from the dead time counter 53 to the drive signal generator 52, the drive signal generator 52 outputs a drive signal Vlo which rises. When the off signal OFF_l is inputted from the digital comparator 51 to the drive signal generator 52, the drive signal generator 52 outputs a drive signal Vlo which falls.

As has been described, the digital control circuit 20a exercises control by the half cycle. Therefore, even if the load state of the switching power supply apparatus suddenly changes, for example, from a no-load state to a normal load state, the digital control circuit 20a is capable of exercising follow-up control without a response delay. Furthermore, an operating point of an FB voltage does not depend on an input voltage of a power supply or the LC constant of a resonance circuit. Accordingly, there is no need to design power supply constants according to switching power supply apparatuses which differ in specification. This improves the flexibility of the design of power supply constants. In the first embodiment resonance current before-inversion time from the beginning of a half cycle to the polarity inversion of a resonance current is used as time information obtained by performing counting from the time when the half cycle begins. In the second embodiment average time obtained by averaging time of a determined number of the last continuous half cycles is used as time information obtained by performing counting from the time when a half cycle begins. However, other time information obtained by performing counting from the time when a half cycle begins may be used. Furthermore, time information obtained by performing counting from before or after the time when a half cycle begins may be used.

The control circuit of the switching power supply apparatus having the above structure controls, at the time of switching, timing at which high-side and low-side switching elements are turned off every half cycle. Therefore, responsiveness to a sudden change in load is improved. Furthermore, only a resonance current is detected. This reduces the number of parts for detection and contributes to a reduction in the costs of the switching power supply apparatus. In addition, an operating point of an FB voltage does not depend on an input voltage of a power supply or the LC constant of a resonance circuit. Accordingly, there is no need to design power supply constants according to switching power supply apparatuses which differ in specification. This improves the flexibility of the design of power supply constants.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that various changes, substitutions, and alterations could be made hereto without departing from the spirit and scope of the invention.

What is claimed is:

1. A method for controlling a switching power supply apparatus which includes a half-bridge circuit having a first high-side switching element and a second low-side switching element connected in series and a resonance circuit having a resonance inductor and a resonance capacitor, the method comprising:
   detecting a resonance current of the resonance circuit;
   acquiring a feedback signal indicative of an error between an output voltage and a target voltage from an output circuit which outputs a direct-current voltage;
   calculating a resonance current after-inversion time, during a half cycle that extends from a time when one of the first high-side switching element or the second low-side switching element is turned off to a time when another of the first switching high-side element or the second low-side switching element is turned off, the calculating of the resonance current after-inversion time extending from a time when a polarity of the resonance current is inverted to a time when the half cycle ends, the calculating being based on a multiplication of time information obtained by performing counting from a time when the half cycle begins and a value of the feedback signal acquired at the time when the half cycle begins, and
   turning off said other of the first high-side switching element or the second low-side switching element after the calculated resonance current after-inversion time has elapsed after the polarity of the resonance current is inverted.

2. The method for controlling the switching power supply apparatus according to claim 1, wherein the time information is a resonance current before-inversion time from the time when the half cycle begins to the time when the polarity of the resonance current is inverted.

3. The method for controlling the switching power supply apparatus according to claim 2, wherein the resonance current after-inversion time is found by calculating the resonance current before-inversion time, calculating a target value of the resonance current after-inversion time from the calculated resonance current before-inversion time and the feedback signal, and using a count value obtained by performing counting from the time when the polarity of the resonance current is inverted, upon detecting that the count value matches the target value.

4. The method for controlling the switching power supply apparatus according to claim 1, wherein the time information is an average time obtained by averaging times of a prescribed number of last continuous half cycles.

5. The method for controlling the switching power supply apparatus according to claim 4, wherein the resonance current after-inversion time is found by calculating the average time, calculating a target value of the resonance current after-inversion time from the calculated average time and the feedback signal, and using a count value obtained by performing counting from the time when the polarity of the resonance current is inverted, upon detecting that the count value matches the target value.

6. The method for controlling the switching power supply apparatus according to claim 5, wherein the average time is found by holding a length of a last continuous half cycle found each time the first high-side switching element and the second low-side switching element are turned off and averaging lengths of the prescribed number of last continuous half cycles held.

7. The method for controlling the switching power supply apparatus according to claim 6, wherein an initial value of a register which holds the length of the last continuous half cycle is set at start time with a value of a minimum half cycle which maximizes a switching frequency.

8. A control circuit of a switching power supply apparatus which includes a first drive signal generator and a second drive signal generator which drive a first high-side switching element and a second low-side switching element, respectively, included in a half-bridge circuit disposed in a resonance circuit having a resonance inductor and a resonance capacitor, the control circuit comprising:
a resonance current detection circuit to which a signal obtained by converting a resonance current of the resonance circuit is inputted;
a feedback signal detection circuit which acquires a feedback signal indicative of an error between an output voltage and a target voltage from an output circuit that outputs a direct-current voltage; and
a control circuit which performs a calculation of a resonance current after-inversion time, during a half cycle that extends from a time when one of the first high-side switching element or the second low-side switching element is turned off to a time when another of the first high-side switching element or the second low-side switching element is turned off, the calculation of the resonance current after-inversion time extending from a time when a polarity of the resonance current is inverted to a time when the half cycle ends, the calculation being based on a multiplication of time information obtained by performing counting from a time when the half cycle begins and a value of the feedback signal acquired at the time when the half cycle begins, and which turns off said other of the first high-side switching element or the second low-side switching element after the calculated resonance current after-inversion time has elapsed after the polarity of the resonance current is inverted.

9. A control circuit of a switching power supply apparatus which includes a first drive signal generator and a second drive signal generator which drive a first high-side switching element and a second low-side switching element, respectively, included in a half-bridge circuit disposed in a resonance circuit having a resonance inductor and a resonance capacitor, the control circuit comprising:
a resonance current detection circuit to which a signal obtained by converting a resonance current of the resonance circuit is inputted;
a feedback signal detection circuit which acquires a feedback signal indicative of an error between an output voltage and a target voltage from an output circuit that outputs a direct-current voltage; and
a turn-off time calculation control circuit which performs a calculation of a turn-off time that extends from a time when one of the first high-side switching element or the second low-side switching element is turned off to a time when another of the first high-side switching element or the second low-side switching element is turned off, the calculation being based on a multiplication of time information obtained by performing counting from the time when the one of the first high-side switching element or the second low-side switching element is turned off, and the feedback signal, and which turns off said other of the first high-side switching element or the second low-side switching element, based on the turn-off time.

10. A control circuit of a switching power supply apparatus which includes a half-bridge circuit having a first high-side switching element and a second low-side switching element connected in series and a resonance circuit having a resonance inductor and a resonance capacitor, the control circuit comprising:
a first current before-inversion time counter and a second current before-inversion time counter which begin a counting operation with a turn-off of one of the first high-side switching element or the second low-side switching element, which detect a resonance current flowing through the resonance circuit, and which stop the counting operation with a polarity inversion of the resonance current;
a first target value calculator and a second target value calculator which calculate a target value indicative of a length of a resonance current after-inversion time from a resonance current before-inversion time and an error signal fed back from an output circuit that outputs a direct-current voltage, the resonance current before-inversion time being a count value of the first current before-inversion time counter or the second current before-inversion time counter;
a first current after-inversion time counter and a second current after-inversion time counter which begin a counting operation with an end of the counting operation of the first current before-inversion time counter or the second current before-inversion time counter; and
a first comparator and a second comparator which compare a count value of the first current after-inversion time counter or the second current after-inversion time counter with the target value and which turn off another of the first high-side switching element or the second low-side switching element upon detecting that the count value of the first current after-inversion time counter or the second current after-inversion time counter matches the target value.

11. The control circuit of the switching power supply apparatus according to claim 10, further comprising:
a pull-up circuit which pulls up with an internal reference voltage an input signal obtained by shunting the resonance current by a shunt circuit connected in parallel with the resonance capacitor and converting an obtained current to a detection voltage; and
a third comparator which compares a voltage obtained by pulling up the input signal by the pull-up circuit with a voltage obtained by dividing the reference voltage at a prescribed ratio and which outputs a signal indicative of the polarity inversion of the resonance current.

12. The control circuit of the switching power supply apparatus according to claim 10, further comprising an analog-to-digital converter which converts the error signal fed back from the output circuit to a digital signal and which inputs the digital signal to the first target value calculator and the second target value calculator.

13. The control circuit of the switching power supply apparatus according to claim 10, further comprising a first dead time counter and a second dead time counter which receive a turn-off signal of one of the first high-side switching element or the second low-side switching element outputted by the first comparator or the second comparator and which count a dead time.

14. The control circuit of the switching power supply apparatus according to claim 13, further comprising a first drive signal generator and a second drive signal generator which receive a turn-off signal of another of the first high-side switching element or the second low-side switching element outputted by the first comparator or the second comparator and a turn-on signal outputted by the first dead time counter or the second dead time counter and which output a drive signal for driving the first high-side switching element or the second low-side switching element.

15. The control circuit of the switching power supply apparatus according to claim 10, wherein:
as the direct-current voltage outputted from the output circuit becomes greater than the target value, the error signal becomes greater; and
the first target value calculator and the second target value calculator calculate the target value, based on a result of a multiplication of the resonance current before-inversion time and a differential obtained by subtracting a prescribed value from the error signal.

16. A control circuit of a switching power supply apparatus which includes a half-bridge circuit having a first high-side switching element and a second low-side switching element connected in series and a resonance circuit having a resonance inductor and a resonance capacitor, the control circuit comprising:
a first counter which begins a counting operation with a turn-off of the first high-side switching element and which stops the counting operation with a turn-off of the second low-side switching element;
a second counter which begins a counting operation with a turn-off of the second low-side switching element and which stops the counting operation with a turn-off of the first high-side switching element;
a half-cycle average value calculator which calculates an average time obtained by averaging times of a prescribed number of last continuous half cycles counted by the first counter and the second counter;
a first target value calculator and a second target value calculator which calculate a target value indicative of a length of a resonance current after-inversion time that extends from a time when a polarity inversion of a resonance current occurs to a time when the first high-side switching element or the second low-side switching element is turned off, based on a half-cycle average value calculated by the half-cycle average value calculator and an error signal fed back from an output circuit that outputs a direct-current voltage;
a first current after-inversion time counter and a second current after-inversion time counter which begin a counting operation with the polarity inversion of the resonance current; and
a first comparator and a second comparator which compare a count value of the first current after-inversion time counter or the second current after-inversion time counter with the target value and which turn off one of the first high-side switching element or the second low-side switching element upon detecting that the count value of the first current after-inversion time counter or the second current after-inversion time counter matches the target value.

17. The control circuit of the switching power supply apparatus according to claim 16, further comprising:
a pull-up circuit which pulls up with an internal reference voltage an input signal obtained by shunting the resonance current by a shunt circuit connected in parallel with the resonance capacitor and converting an obtained current to a detection voltage; and
a third comparator which compares a voltage obtained by pulling up the input signal by the pull-up circuit with a voltage obtained by dividing the reference voltage at a prescribed ratio and which outputs a signal indicative of the polarity inversion of the resonance current.

18. The control circuit of the switching power supply apparatus according to claim 16, further comprising an analog-to-digital converter which converts the error signal fed back from the output circuit to a digital signal and which inputs the digital signal to the first target value calculator and the second target value calculator.

19. The control circuit of the switching power supply apparatus according to claim 16, further comprising a first dead time counter and a second dead time counter which receive a turn-off signal of one of the first high-side switching element or the second low-side switching element outputted by the first comparator or the second comparator and which count a dead time.

20. The control circuit of the switching power supply apparatus according to claim 19, further comprising a first drive signal generator and a second drive signal generator which receive a turn-off signal of another of the first high-side switching element or the second low-side switching element outputted by the first comparator or the second comparator and a turn-on signal outputted by the first dead time counter or the second dead time counter and which output a drive signal for driving the first high-side switching element or the second low-side switching element.

21. The control circuit of the switching power supply apparatus according to claim 16, wherein:
as a magnitude of a load connected to the output circuit increases, the error signal becomes greater; and
the first target value calculator and the second target value calculator calculate the target value, based on a result of a multiplication of the half-cycle average value and the error signal.

* * * * *